United States Patent
Beck et al.

(10) Patent No.: US 10,913,342 B2
(45) Date of Patent: Feb. 9, 2021

(54) TRANSMISSION FOR A MOTOR VEHICLE

(71) Applicant: ZF Friedrichshafen AG, Friedrichshafen (DE)

(72) Inventors: Stefan Beck, Eriskirch (DE); Johannes Kaltenbach, Friedrichshafen (DE); Matthias Horn, Tettnang (DE); Viktor Warth, Friedrichshafen (DE); Fabian Kutter, Kressbronn (DE); Michael Wechs, Weißensberg (DE); Uwe Griesmeier, Markdorf (DE); Jens Moraw, Markdorf (DE); Gerhard Niederbrucker, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/772,553

(22) PCT Filed: Nov. 20, 2018

(86) PCT No.: PCT/EP2018/081982
§ 371 (c)(1),
(2) Date: Jun. 12, 2020

(87) PCT Pub. No.: WO2019/115180
PCT Pub. Date: Jun. 20, 2019

(65) Prior Publication Data
US 2020/0384847 A1    Dec. 10, 2020

(30) Foreign Application Priority Data

Dec. 14, 2017   (DE) .................. DE10 2017 222 711

(51) Int. Cl.
*F16H 3/66*    (2006.01)
*B60K 6/365*   (2007.10)
(Continued)

(52) U.S. Cl.
CPC ............... *B60K 6/365* (2013.01); *F16H 3/66* (2013.01); *B60K 6/48* (2013.01); *B60K 6/547* (2013.01);
(Continued)

(58) Field of Classification Search
CPC .......... B60K 6/365; B60K 6/547; B60K 6/48; B60K 2006/4816; F16H 3/66;
(Continued)

(56) References Cited

U.S. PATENT DOCUMENTS

| 3,592,082 A | 7/1971 | Ott |
| 5,911,642 A | 6/1999 | Andres et al. |

(Continued)

FOREIGN PATENT DOCUMENTS

| DE | 102008000429 A1 | 9/2009 |
| WO | WO 2016091524 | 6/2006 |

OTHER PUBLICATIONS

International Search Report (English Translation) PCT/EP2018/081982, dated Feb. 5, 2019. (2 pages).

*Primary Examiner* — David J Hlavka
(74) *Attorney, Agent, or Firm* — Dority & Manning, P.A.

(57) ABSTRACT

A transmission (G) for a motor vehicle includes an electric machine (EM), an input shaft (GW1), an output shaft (GWA), two planetary gear sets (P1, P2), and at least five shift elements (A, B, C, D, E). Different gears can be selected by selectively actuating the at least five shift elements (A, B, C, D, E). In interaction with the electric machine (EM), different operating modes can be implemented.

20 Claims, 15 Drawing Sheets

(51) Int. Cl.
 *B60K 6/48* (2007.10)
 *B60K 6/547* (2007.10)

(52) U.S. Cl.
 CPC ............... *B60K 2006/4816* (2013.01); *F16H 2200/2046* (2013.01); *F16H 2200/2094* (2013.01); *F16H 2200/2097* (2013.01)

(58) Field of Classification Search
 CPC ..... F16H 2200/2094; F16H 2200/2046; F16H 2200/2097
 See application file for complete search history.

(56) References Cited

U.S. PATENT DOCUMENTS

| | | |
|---|---|---|
| 2011/0009229 A1 | 1/2011 | Bauknecht et al. |
| 2017/0156315 A1* | 6/2017 | Becker ................... A01N 27/00 |
| 2018/0156315 A1* | 6/2018 | Beck ........................ B60K 6/48 |

* cited by examiner

| Gear | A | B | C | D | E |
|------|---|---|---|---|---|
| 1    |   | x | x |   |   |
| 2.1  | x | x |   |   | x |
| 2.2  |   |   | x |   | x |
| 2.3  | x |   | x |   | x |
| 2.4  |   |   |   |   |   |
| 2.5  |   |   |   |   | x |
| 3.1  | x | x |   | x |   |
| 3.2  |   |   | x | x |   |
| 3.3  |   |   |   | x |   |
| 3.4  |   |   |   | x |   |
| EDA-V| x |   |   |   |   |
| E1   |   | x |   |   |   |

Fig. 5

| Gear | A | B | C | D | E | F |
|---|---|---|---|---|---|---|
| 1 |   | x | x |   |   |   |
| 2.1 |   | x |   |   | x |   |
| 2.2 | x |   |   |   | x |   |
| 2.3 |   |   | x |   | x |   |
| 2.4 | x |   | x |   |   |   |
| 2.5 |   |   |   |   | x |   |
| 2.6 |   |   |   |   | x | x |
| 2.7 | x |   |   |   |   | x |
| 2.8 |   | x | x |   |   | x |
| 3.1 |   |   |   | x |   |   |
| 3.2 | x |   |   | x |   |   |
| 3.3 |   |   | x | x |   |   |
| 3.4 |   |   |   | x |   |   |
| 3.5 |   |   |   | x |   | x |
| EDA-V | x |   |   |   |   |   |
| E1 |   | x |   |   |   |   |
| E2 |   |   |   |   |   | x |

Fig. 9

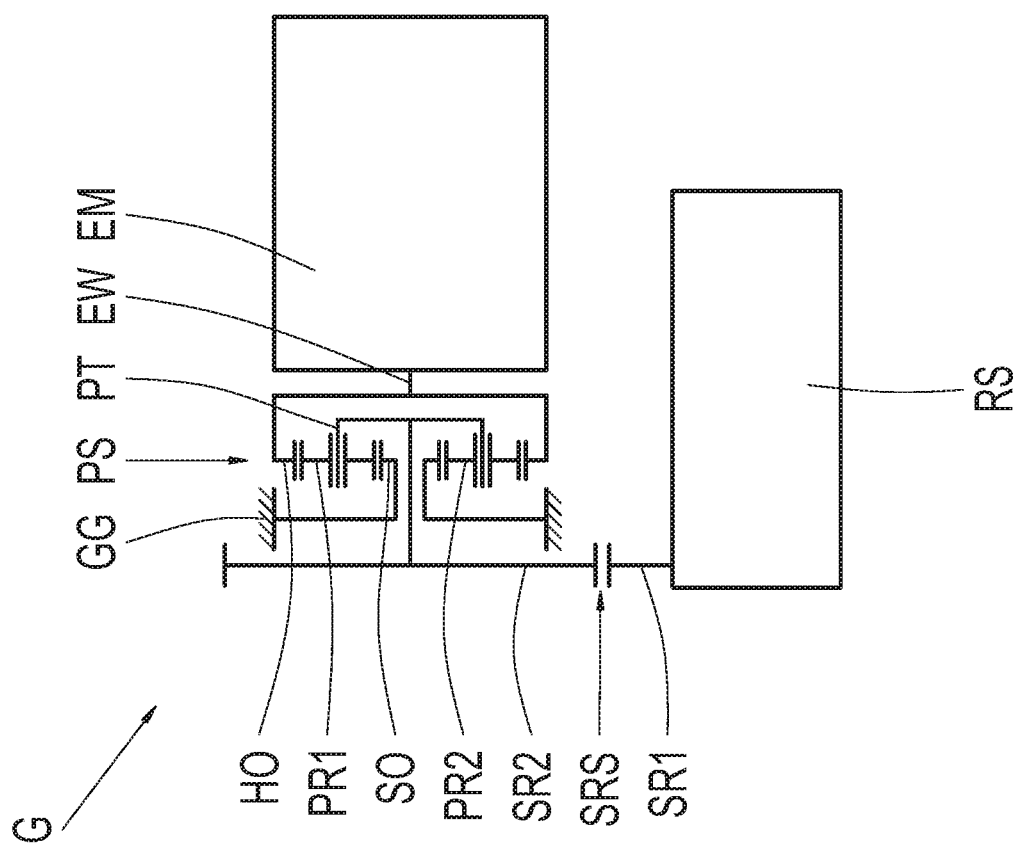

TRANSMISSION FOR A MOTOR VEHICLE

CROSS-REFERENCE TO RELATED APPLICATIONS

The present application is related and has right of priority to PCT Publication No. 2019/115180 filed on Nov. 20, 2018 and to German Patent Application No. 10 2017 222 711.7 filed on Dec. 14, 2017, both of which are incorporated by reference in their entirety for all purposes.

FIELD OF THE INVENTION

The invention relates generally to a transmission for a motor vehicle. Moreover, the invention relates generally to a motor vehicle drive train, in the case of which an aforementioned transmission is utilized, and to a method for operating a transmission.

BACKGROUND

In the case of hybrid vehicles, transmissions are known which include not only a gear set, but also one or multiple electric machines. In this case, the transmission is usually configured to be multi-stage, i.e., multiple different transmission ratios can be selected, as gears, between an input shaft and an output shaft by actuating appropriate shift elements, wherein this is preferably automatically carried out. Depending on the arrangement of the shift elements, the shift elements are clutches or even brakes. The transmission is utilized in this case for suitably implementing an available tractive force of a prime mover of the motor vehicle with respect to various criteria. In this case, the gears of the transmission are mostly also utilized in interaction with the at least one electric machine for implementing purely electric driving. Frequently, the at least one electric machine can also be integrated in the transmission in order to implement various operating modes in different ways.

U.S. Pat. No. 5,911,642 A describes a transmission, which includes not only an input shaft and an output shaft, but also two planetary gear sets, six shift elements, and one electric machine. The input shaft can be rotationally fixed to a first element of the first planetary gear set by engaging a first shift element, wherein the first element of the first planetary gear set can also be fixed with the aid of a second shift element. By way of the selective actuation of the shift elements, different gears can be implemented between the input shaft and the output shaft, wherein a hybrid function can also be implemented by integrating the electric machine.

SUMMARY OF THE INVENTION

Example aspects of the present invention provide an alternative embodiment to the transmission for a motor vehicle known from the prior art, with the aid of which different operating modes can be implemented in a suitable way, and which has a compact design.

According to example aspects of the invention, a transmission includes an electric machine, an input shaft, an output shaft, as well as a first planetary gear set and a second planetary gear set. The two planetary gear sets include multiple elements. A first element, a second element, and a third element are associated with each of the planetary gear sets. The first element is formed by a sun gear of the particular planetary gear set, while the second element, in the case of a negative/minus planetary gear set, is formed by a planet carrier and, in the case of a positive/plus planetary gear set, by a ring gear of the particular planetary gear set. The third element, in the case of a negative/minus planetary gear set, is present as a ring gear and, in the case of a positive/plus planetary gear set, as a planet carrier of the particular planetary gear set.

The planetary gear sets can each be present as a negative/minus planetary gear set, provided a connection of the elements permits this, i.e., within the scope of the invention. The first element of the particular planetary gear set is a sun gear in this case, the second element of the particular planetary gear set is a planet carrier, and the third element of the particular planetary gear set is a ring gear. In this case, a negative/minus planetary gear set is composed, in a way known, in principle, to a person skilled in the art, of the elements sun gear, planet carrier, and ring gear, wherein the planet carrier guides, in a rotatably mounted manner, at least one planet gear, although preferably multiple planet gears, which each individually intermesh with the sun gear as well as with the surrounding ring gear.

Alternatively thereto, one planetary gear set or even both planetary gear sets could also be present as a positive/plus planetary gear set, however, provided the connection of the particular elements permits this. The first element of the particular planetary gear set is a sun gear in this case, the second element of the particular planetary gear set is a ring gear, and the third element of the particular planetary gear set is a planet carrier. In a positive/plus planetary gear set as well, the elements sun gear, ring gear, and planet carrier are present, wherein the latter guides at least one planet gear pair, in which one planet gear is meshed with the internal sun gear and the other planet gear is meshed with the surrounding ring gear, and the planet gears are intermeshed with each other.

Where permitted by a connection of the individual elements, a negative/minus planetary gear set can be converted into a positive/plus planetary gear set, wherein, as compared to the design as a negative/minus planetary gear set, the ring gear connection and the planet carrier connection are to be interchanged, and a stationary transmission ratio is to be increased by one. Conversely, a positive/plus planetary gear set could also be replaced by a negative/minus planetary gear set, provided the connection of the elements of the transmission enables this. In this case, as compared to the positive/plus planetary gear set, the ring gear connection and the planet carrier connection would also need to be interchanged, and a stationary transmission ratio would need to be reduced by one. It is particularly preferred, however, when both planetary gear sets are present as negative/minus planetary gear sets.

In addition, a first shift element, a second shift element, a third shift element, a fourth shift element, and a fifth shift element are provided, via the selective actuation of which different power paths can be implemented while shifting different gears. It is particularly preferred when, in terms of the ratio, precisely three different gears can be formed between the input shaft and the output shaft. Moreover, the electric machine is connected to the input shaft, to the output shaft, or to at least one of the elements of the planetary gear sets. Moreover, the input shaft can be connected in a rotationally fixed manner via the first shift element to the first element of the first planetary gear set, which can be rotationally fixed with the aid of the second shift element.

Within the meaning of the invention, a "shaft" is understood to be a rotatable component of the transmission, via which associated components of the transmission are rotationally fixed to each other or via which a connection of this type is established upon actuation of an appropriate shift element. The particular shaft can connect the components to each other axially or radially or even both axially and radially in this case. The particular shaft can therefore also be present as an intermediate piece, via which a particular component is connected, for example, radially.

Within the meaning of the invention, the term "axially" means an orientation in the direction of a longitudinal central axis along which the planetary gear sets are arranged coaxially to each other. "Radially" is then understood to mean an orientation in the direction of the diameter of a shaft that lies on this longitudinal central axis.

Preferably, the output shaft of the transmission includes a tooth system, via which the output shaft is then operatively connected, in the motor vehicle drive train, to a differential gear arranged axially parallel to the output shaft. In this case, the tooth system is preferably provided at a mounting interface of the output shaft, wherein this mounting interface of the output shaft is situated, in particular, axially in the area of an end of the transmission, at which a mounting interface of the input shaft is also provided, the mounting interface establishing the connection to the prime mover connected upstream therefrom. This type of arrangement is particularly suitable for the application in a motor vehicle including a drive train aligned transversely to the direction of travel of the motor vehicle.

Alternatively, an output shaft of the transmission could also be provided, in principle, however, at an axial end of the transmission situated opposite a mounting interface of the input shaft. In this case, a mounting interface of the output shaft is designed at an axial end of the output shaft coaxially to a mounting interface of the input shaft, so that the input and the output of the transmission are located at opposite axial ends of the transmission. A transmission configured in this way is suitable for use in a motor vehicle including a drive train aligned in the direction of travel of the motor vehicle. The input shaft and the output shaft are preferably situated coaxially to each other in both aforementioned cases.

The planetary gear sets are preferably arranged in the sequence first planetary gear set and second planetary gear set axially subsequent to the mounting interface of the input shaft. An alternative arrangement of the planetary gear sets can also be implemented within the scope of the invention, however. In addition, the planetary gear sets are preferably provided coaxially to the input shaft and the output shaft.

Example aspects of the invention now encompasses the technical teaching that the input shaft is also rotationally fixed to the second element of the second planetary gear set. Moreover, the output shaft is rotationally fixed to the second element of the first planetary gear set, while the input shaft can be connected in a rotationally fixed manner via the third shift element to the third element of the first planetary gear set.

In other words, in the case of the transmission according to example aspects of the invention, the input shaft is therefore continuously rotationally fixed to the second element of the second planetary gear set, whereas the output shaft is permanently rotationally fixed to the second element of the first planetary gear set.

By engaging the first shift element, the input shaft is rotationally fixed to the first element of the first planetary gear set, while an actuation of the second shift element brings about a fixation of the first element of the first planetary gear set. In the engaged condition of the third shift element, the input shaft is also brought into a rotationally fixed connection with the third element of the first planetary gear set.

In the present case, the first shift element and the third shift element are therefore configured as clutches, which, upon actuation, synchronize, if necessary, the particular components of the transmission joined directly to the clutches, with respect to their turning motions and, thereafter, connect the components to each other in a rotationally fixed manner. By comparison, the second shift element is present as a brake, which, in the engaged condition, rotationally fixes the component joined directly thereto and, consequently, prevents the component from turning.

Preferably, the first shift element is provided axially between the first planetary gear set and the second planetary gear set, while the second shift element is located, in particular axially, on a side of the first planetary gear set facing away from the second planetary gear set. The third shift element is preferably arranged axially on a side of the second planetary gear set facing away from the first planetary gear set.

A particular rotationally fixed connection of the rotatable components of the transmission is preferably implemented, according to example aspects of the invention, via one or even multiple intermediate shafts, which can also be present, in this case, as short intermediate pieces when the components are positioned in a spatially dense manner. Specifically, the components that are permanently rotationally fixed to each other can each be present either as individual components that are rotationally fixed to each other, or even as single pieces. In the second case mentioned above, the particular components and the optionally present shaft are formed by one common component, wherein this is implemented, in particular, for the case in which the particular components are situated spatially close to each other in the transmission.

In the case of components of the transmission that are connected to each other only upon actuation of a respective shift element, a connection is also preferably implemented via one or even multiple intermediate shafts.

A fixation takes place, in particular, by way of a rotationally fixed connection to a rotationally fixed component of the transmission, which is preferably a permanently non-rotating component, preferably a housing of the transmission, a part of such a housing, or a component rotationally fixed thereto.

Within the meaning of the invention, the "connection" of the electric machine to the input shaft, the output shaft, or at least one of the elements of the planetary gear sets is to be understood as a connection of such a type that a constant rotational-speed dependence prevails between a rotor of the electric machine and the particular component of the transmission.

Overall, a transmission according to example aspects of the invention is distinguished by a compact design, low component loads, good gearing efficiency, and low losses.

According to one example embodiment of the invention, the first element of the second planetary gear set is fixed, whereas the output shaft is brought into a rotationally fixed connection, with the aid of the fourth shift element, with the third element of the second planetary gear set and can be rotationally fixed to the input shaft via the fifth shift element. In this case, the first element of the second planetary gear set is therefore continuously fixed and, therefore, is also permanently prevented from turning. In addition, by engaging the fourth shift element, a rotationally fixed connection of the output shaft to the third element of the second planetary gear set is established, while an actuation of the fifth shift element brings about a rotationally fixed connection of the input shaft to the output shaft.

It is particularly preferred when the fourth shift element and the fifth shift element are provided axially between the first planetary gear set, wherein, in this case, more preferably, the fourth shift element is situated axially adjacent to the first planetary gear set and, positioned axially subsequent thereto are, initially, the fifth shift element and then the first shift element.

According to one alternative example design option of the invention, the third element of the second planetary gear set is rotationally fixed to the output shaft, whereas the first element of the second planetary gear set can be fixed via the fourth shift element. Moreover, the first element and the second element of the second planetary gear set or the second element and the third element of the second planetary gear set can be connected to each other in a rotationally fixed manner with the aid of the fifth shift element. In this example variant, the output shaft is therefore continuously rotationally fixed to the third element of the second planetary gear set, while the first element of the second planetary gear set is fixed only upon engagement of the fourth shift element and, consequently, is prevented from turning. In addition, upon an engagement of the fifth shift element, either the first element and the second element of the second planetary gear set or the second element and the third element of the second planetary gear set are connected to each other in a rotationally fixed manner, which, in both cases, results in an interlock of the second planetary gear set.

It is particularly preferred when, in this case, the fourth shift element and the fifth shift element are provided axially on a side of the second planetary gear set facing away from the first planetary gear set. Within the scope of the invention, however, the fifth shift element can also be provided axially between the first planetary gear set and the second planetary gear set.

In one example refinement of the invention, a rotor of the electric machine is rotationally fixed to the third element of the first planetary gear set. Alternatively, the rotor is permanently coupled to the third element of the first planetary gear set via at least one transmission ratio step. In principle, the electric machine can be arranged either coaxially to the third element of the first planetary gear set or axially offset with respect thereto. In the former case, the rotor of the electric machine can either be rotationally fixed directly to the third element of the first planetary gear set or coupled thereto via one or even multiple intermediate transmission ratio step(s), wherein the latter allows for a more favorable configuration of the electric machine with higher rotational speeds and lower torques. The at least one transmission ratio step can be designed as a spur gear stage and/or as a planetary gear stage in this case. In the case of a coaxial arrangement of the electric machine, the planetary gear sets can then also, more preferably, be arranged, at least in part, axially in the area of the electric machine as well as radially within the electric machine, so that the axial installation length of the transmission can be shortened.

If the electric machine is provided axially offset with respect to the third element of the first planetary gear set, however, a coupling takes place via one or multiple intermediate transmission ratio step(s) and/or a flexible traction drive mechanism. The one or multiple transmission ratio step(s) can also be implemented individually, in this case, as a spur gear stage or as a planetary gear stage. A flexible traction drive mechanism can be either a belt drive or a chain drive.

According to one example embodiment of the invention, in particular in combination with the above-described arrangement of the electric machine, three gears result between the input shaft and the output shaft by way of the selective engagement of the five shift elements. In this way, a first gear can be implemented between the input shaft and the output shaft by actuating the second shift element and the third shift element, while a second gear results between the input shaft and the output shaft, in a first example variant, by engaging the second shift element and the fifth shift element. In addition, the second gear can also be selected, in a second example variant, by actuating the first and the fifth shift elements, in a third example variant by engaging the third and the fifth shift elements, in a fourth example variant by actuating the first and the third shift elements, and in a fifth example variant by engaging the fifth shift element. In the fifth example variant, the second gear already results, since, in this case, the input shaft and the output shaft are connected to each other in a rotationally fixed manner. Advantageously, an electric machine connected to the third element of the first planetary gear set is then decoupled in this case, so that "simple driving" is implemented via the upstream prime mover and, therefore, zero-load losses of the electric machine can be avoided. The electric machine is integrated in the first four example variants of the second gear, however, so that hybrid functions can be implemented.

The third gear between the input shaft and the output shaft is selected, in a first example variant, by actuating the second and the fourth shift elements, in a second example variant by actuating the first and the fourth shift elements, in a third example variant by engaging the third and the fourth shift elements, and in a fourth example variant by actuating the fourth shift element. In the last example variant, an electric machine connected to the third element of the first planetary gear set is decoupled, while, in the case in which the fourth shift element is engaged, the input shaft and the output shaft are coupled to one another via the second planetary gear set. Therefore, zero-load losses of the electric machine can be avoided in this case. In the first three example variants of the third gear, however, the electric machine is integrated via the additional actuation of one further shift element, so that hybrid functions can be implemented.

With the aid of a suitable selection of stationary transmission ratios of the planetary gear sets, a transmission ratio range which is suitable for the application in the case of a motor vehicle is implemented. In this case, gear shifts between the gears can be implemented, in which only the condition of two shift elements is to be varied in each case, in that one of the shift elements contributing to the previous gear is to be disengaged and another shift element for implementing the subsequent gear is to be engaged. As a further consequence thereof, a shift between the gears can take place very rapidly.

Upon connecting the electric machine to the third element of the first planetary gear set, in addition, different operating modes can be implemented in a simple way.

A first gear between the rotor of the electric machine and the output shaft can be utilized for purely electric driving, wherein this first gear results by engaging the second shift element. As a result, the rotor of the electric machine is coupled to the output shaft via the first planetary gear set, wherein a ratio of this first gear corresponds to a ratio of the first gear, which is effective between the input shaft and the output shaft.

Starting from purely electric driving in the first gear, which is effective between the rotor of the electric machine and the output shaft, the upstream prime mover can be started in the first gear, which is effective between the input shaft and the output shaft, or in the first example variant of the second gear, which is effective between the input shaft and the output shaft, or in the first example variant of the third gear, which is effective between the input shaft and the output shaft, since the second shift element contributes to each of these.

As a further operating mode, a charging operation of an electric accumulator can also be implemented, in that only the third shift element is engaged and, therefore, a rotationally fixed connection of the input shaft to the third element of the first planetary gear set and, therefore, also a connection to the electric machine are established. The input shaft and the third element of the first planetary gear set rotate at the same rotational speed in this case. At the same time, a force-fit connection to the output shaft is not established, and therefore the transmission is in a neutral position. Apart from a charging operation, a start of the upstream prime mover via the electric machine can also be implemented as a result.

Moreover, powershifts with tractive force support can be implemented. During the gearchange between the first gear, which is effective between the input shaft and the output shaft, and the first example variant of the second gear, which is effective between the input shaft and the output shaft, the tractive force with the second shift element engaged can be supported via the electric machine, wherein the synchronization of the shift element to be engaged takes place via a closed-loop control of the rotational speed of the upstream prime mover. Alternatively, however, this can also take place with the aid of synchronized shift elements or even with the aid of another, separate synchronizing mechanism, such as a transmission brake or even one further electric machine, which can be operatively connected directly or indirectly to the input shaft. If one further shift element, as a separating clutch, is also provided on the input side of the input shaft, the inertial mass of the upstream drive machine can be decoupled during the synchronization. A gearchange can also be implemented between the first example variant of the second gear and the first example variant of the third gear under load, with the second shift element engaged.

As yet another operating mode, a starting mode for forward travel can also be implemented during driving with the aid of the input shaft and, therefore, with the aid of the upstream drive machine. For this purpose, the first shift element is engaged, and therefore the prime mover drives via the first element of the first planetary gear set and, simultaneously, the electric machine provides support at the third element of the first planetary gear set, while an output takes place via the second element of the first planetary gear set. By supporting the torque with the aid of the electric machine, a starting operation for forward travel can be implemented. Starting from this starting mode, the upstream prime mover can enter the second example variant or into the fourth example variant of the second gear or into the second example variant of the third gear.

The transmission according to example aspects of the invention can also be operated in such a way that a rotational-speed reduction of the electric machine is achieved during driving. It is therefore possible to initially drive in a hybrid manner in the first example variant of the third gear, in that the second shift element initially remains engaged either after a gear shift from the second gear into the third gear with torque assistance from the electric machine or after a start of the prime mover into the third gear. In order to then reduce a rotational speed of the electric machine in the third gear at higher ground speeds, however, a change-over can be carried out from the first example variant of the third gear into the second example variant of the third gear, since the rotor of the electric machine has a lower rotational speed in this case than in the first example variant of the third gear. This change-over takes place while obtaining the tractive force via the upstream drive machine, with the fourth shift element engaged. Initially, the load-free, second shift element is disengaged and, subsequent thereto, the load-free, first shift element is engaged, wherein the rotational-speed adaptation takes place in this case with the aid of closed-loop control of the rotational speed of the electric machine.

If a separating clutch is also provided between the transmission and the upstream prime mover, the upstream prime mover can be decoupled in the second example variant of the third gear, in order to implement a regenerative braking even from higher ground speeds, while the upstream prime mover is decoupled or switched off.

One further example embodiment of the invention is that a sixth shift element is also provided, which, upon actuation, connects two of the three elements of the first planetary gear set to each other in a rotationally fixed manner. In other words, the transmission may therefore additionally include a sixth shift element, which, in the engaged condition, brings about an interlock of the first planetary gear set, in that the sixth shift element, upon actuation, connects, in a rotationally fixed manner, the first element and the second element of the first planetary gear set, or the second element and the third element of the first planetary gear set, or the first element and the third element of the first planetary gear set. This sixth shift element, designed as a clutch, is provided, preferably axially in this case, on a side of the first planetary gear set facing away from the second planetary gear set and is situated, in particular axially in this case, between the second shift element and the first planetary gear set.

By providing the sixth shift element, further example variants of the second gear, which is effective between the input shaft and the output shaft, as well as one further example variant of the third gear, which is effective between the input shaft and the output shaft, can be implemented. The second gear also results, in a sixth example variant, by engaging the fifth and the sixth shift elements, in a seventh example variant by actuating the first and the sixth shift elements, and in an eighth example variant by engaging the third and the sixth shift elements. A fifth example variant of the third gear is selected by actuating the fourth and the sixth shift elements.

In combination with the example embodiment, according to which the rotor of the electric machine is connected at the third element of the first planetary gear set, a second gear can also be selected between the rotor of the electric machine and the output shaft by actuating the sixth shift element. Due to the first planetary gear set, which is interlocked in this case, the output shaft is then directly connected to the third element of the first planetary gear set in a rotationally fixed manner, so that the rotor, in the case of a rotationally fixed connection to the third element of the first planetary gear set, is also directly connected to the output shaft in a rotationally fixed manner. A ratio of the second gear, which is effective between the rotor and the output shaft, corresponds to a ratio of the second gear, which is effective between the input shaft and the output shaft.

Starting from the second gear, which is effective between the rotor of the electric machine and the output shaft, a start of the upstream prime mover into the sixth example variant, into the seventh example variant, or even into the eighth example variant of the second gear, and into the fifth example variant of the third gear can be implemented, since the sixth shift element also contributes to each of these.

In addition, a rotational-speed reduction of the rotor of the electric machine can be implemented with the aid of a change-over from the first example variant of the third gear, which is effective between the input shaft and the output shaft, into the fifth example variant of the third gear. For this purpose, after an electrically-supported gear shift from the second gear into the third gear or after a start of the prime mover into the third gear from the first example variant of the third gear, a change-over takes place into the fifth example variant, in which the rotor has a lower rotational speed than in the first example variant of the third gear. This change-over takes place while obtaining the tractive force via the upstream prime mover with the fourth shift element engaged, wherein the load-free, second shift element is disengaged and the likewise load-free, sixth shift element is engaged. The rotational-speed adaptation takes place via closed-loop control of the rotational speed with the aid of the electric machine.

In addition, a separate shift element is not necessary for decoupling the upstream prime mover, since, in the fifth example variant of the third gear, which is effective between the input shaft and the output shaft, the upstream prime mover can be decoupled by disengaging the fourth shift element. As a result, the second gear is then implemented, which is active between the rotor of the electric machine and the output shaft. In addition, in the case of a vehicle that is slowing down, a downshift from the third gear, which is effective between the input shaft and the output shaft, into the second gear, which is effective between the input shaft and the output shaft, can be prepared, in that, initially, a change-over takes place from the fifth example variant into the first example variant of the third gear and, in the process, the tractive force is obtained via the upstream prime mover, with the fourth shift element engaged. In the first example variant of the third gear, the second shift element is engaged, which becomes necessary in order to support the tractive force via the electric machine as part of the downshift from the third gear into the second gear.

In one example refinement of the invention, one or multiple shift element(s) are each implemented as a form-locking shift element. In this case, the particular shift element is preferably designed either as a constant-mesh shift element or as a lock-synchronizer mechanism. Form-locking shift elements have the advantage over friction-locking shift elements that lower drag losses occur in the disengaged condition, and therefore a better efficiency of the transmission can be achieved. In particular, in the transmission according to example aspects of the invention, all shift elements are implemented as form-locking shift elements, and therefore the lowest possible drag losses can be achieved. In principle, however, one or multiple shift element(s) could also be designed as force-locking shift elements and, in particular, as lamellar shift elements.

According to one further example embodiment of the invention, the fourth shift element and the fifth shift element are combined to form one shift element pair, with which one actuating element is associated. The fourth shift element, on the one hand, and the fifth shift element, on the other hand, can be actuated with the aid of the actuating element starting from a neutral position. This has the advantage that, due to this combination, the number of actuating elements can be reduced and, therefore, the manufacturing complexity can also be reduced.

In addition, the first and the third shift elements can also be combined to form one shift element pair, in which the first shift element, on the one hand, and the third shift element, on the other hand, can be transferred into an engaged condition with the aid of one common actuating element. Moreover, it is a conceivable example variant of the invention that the first shift element and the second shift element as well as the third shift element and the fifth shift element are combined to form shift element pairs. Alternatively, in addition, the first shift element and the second shift element, on the one hand, as well as the fourth shift element and the fifth shift element, on the other hand, can also be formed by one shift element pair in each case.

If a sixth shift element is also provided, this can be combined, within the scope of an example embodiment of the invention, with the second shift element to form a shift element pair, in that an actuating element is provided, with the aid of which the second shift element, on the one hand, and the sixth shift element, on the other hand, can be actuated from a neutral position.

It is particularly preferred when, in the case of the transmission according to example aspects of the invention, a preferably large number of shift element pairs is implemented, in order to reduce the number of actuating elements and, therefore, to reduce the manufacturing complexity. Two or even three shift element pairs are provided, if possible.

Within the scope of example aspects of the invention, a starting component can be installed upstream from the transmission, for example a hydrodynamic torque converter or a friction clutch. This starting component can then also be an integral part of the transmission and is utilized for configuring a starting process, in that the starting component enables a slip speed between the prime mover, which is designed, in particular, as an internal combustion engine, and the input shaft of the transmission. In this case, one of the shift elements of the transmission or the separating clutch, which may be present, can also be designed as such a starting component, in that the starting component is present as a frictional shift element. In addition, a one-way clutch with respect to the transmission housing or to another shaft can be arranged on each shaft of the transmission, in principle.

The transmission according to example aspects of the invention is, in particular, part of a motor vehicle drive train for a hybrid or electric vehicle and is then arranged between a prime mover of the motor vehicle, which is configured as an internal combustion engine or as an electric machine, and further components of the drive train, which are arranged downstream in the direction of power flow to driving wheels of the motor vehicle. In this case, the input shaft of the transmission is either permanently coupled to a crankshaft of the internal combustion engine or to the rotor shaft of the electric machine in a rotationally fixed manner or can be connected thereto via an intermediate separating clutch or a starting component, wherein a torsional vibration damper can also be provided between an internal combustion engine and the transmission. On the output end, the transmission is then preferably coupled, within the motor vehicle drive train, to a differential gear of a drive axle of the motor vehicle, wherein a connection to an interaxle differential can also be present in this case, however, via which a distribution to multiple driven axles of the motor vehicle takes place. The differential gear or the interaxle differential can be arranged with the transmission in one common housing in this case. A torsional vibration damper, which is optionally present, can also be integrated into this housing.

Within the meaning of the invention, the expressions that two components of the transmission are "connected" or "coupled" or "are connected to each other" mean a permanent coupling of these components, and therefore said components cannot rotate independently of each other. In that respect, no shift element is provided between these components, which can be elements of the planetary gear sets and/or even shafts and/or a rotationally fixed component of the transmission. Instead, the corresponding components are coupled to each other with a consistent rotational speed dependence.

However, if a shift element is provided between two components, these components are not permanently coupled to each other. Instead, a coupling is carried out only by actuating the intermediate shift element. In this case, an actuation of the shift element means, within the meaning of the invention, that the particular shift element is transferred into an engaged condition and, consequently, synchronizes the turning motions, if necessary, of the components connected directly thereto. In the case of an embodiment of the particular shift element as a form-locking shift element, the components directly connected to each other in a rotationally fixed manner via the shift element rotate at the same rotational speed, while, in the case of a force-locking shift element, speed differences can exist between the components even after an actuation of said shift element. This intentional or even unintentional condition is nevertheless referred to, within the scope of the invention, as a rotationally fixed connection of the respective components via the shift element.

The invention is not limited to the specified combination of features of the main claim or the claims dependent thereon. In addition, individual features can be combined with one another, provided they arise from the claims, the description of preferred embodiments of the invention which follows, or directly from the drawings. References in the claims to the drawings via the use of reference characters is not intended to limit the scope of protection of the claims.

BRIEF DESCRIPTION OF THE DRAWINGS

Advantageous example embodiments of the invention, which are explained in the following, are represented in the drawings. Wherein:

FIG. 5 shows an exemplary shift pattern of the transmissions from FIGS. 2 to 4;

FIG. 9 shows an exemplary shift pattern of the transmissions from FIGS. 6 to 8; and FIGS. 10 through 15 each show a schematic of one modification of the transmissions from FIGS. 2 through 4 and 6 through 8.

DETAILED DESCRIPTION

Figure 1:
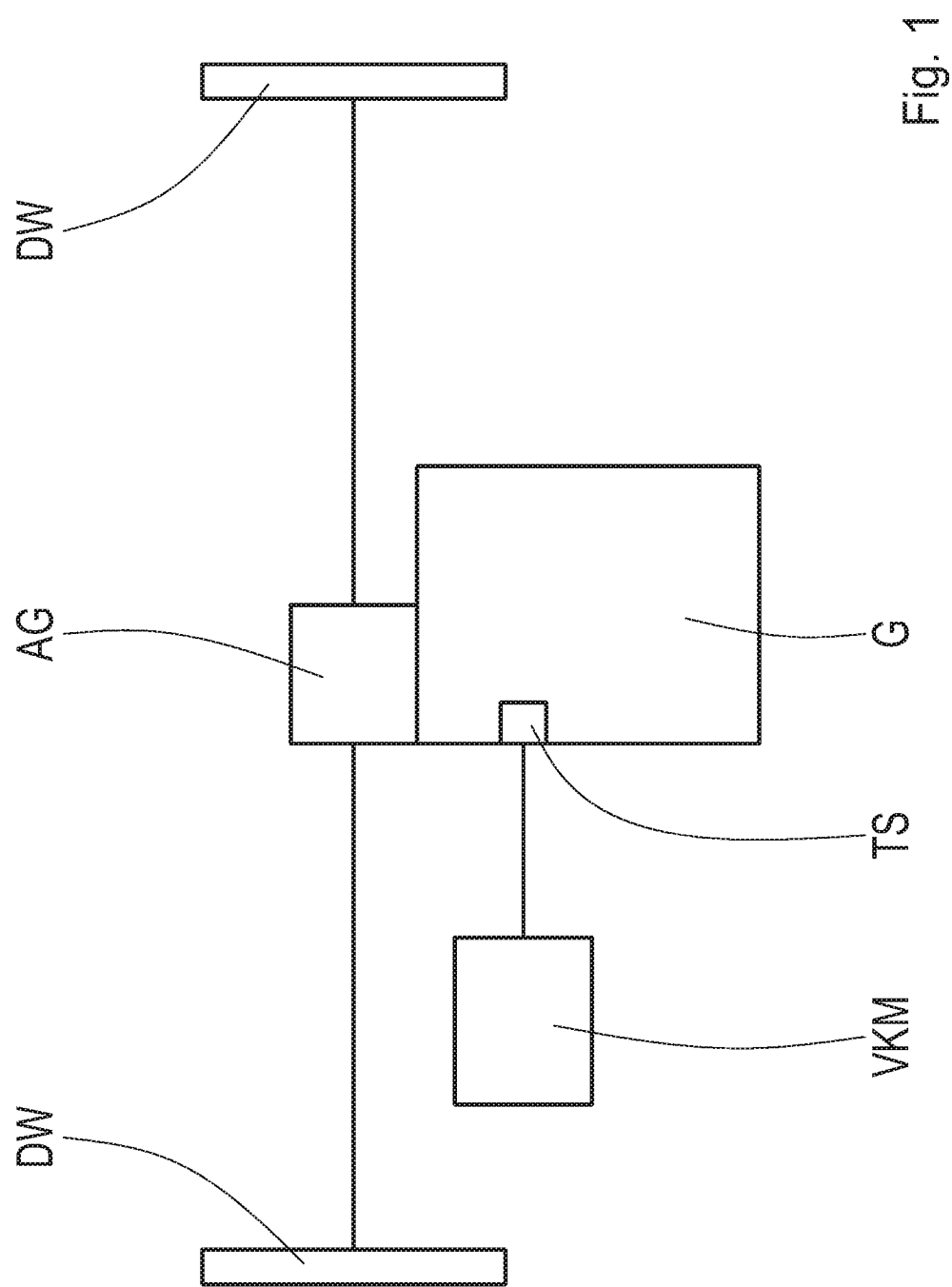
FIG. 1 shows a diagrammatic view of a motor vehicle drive train.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a diagrammatic view of a motor vehicle drive train of a hybrid vehicle, wherein, in the motor vehicle drive train, an internal combustion engine VKM is connected to a transmission G via an intermediate torsional vibration damper TS. Connected downstream from the transmission G, on the output end thereof, is a differential gear AG, via which drive power is distributed to driving wheels DW on a drive axle of the motor vehicle. The transmission G and the torsional vibration damper TS are arranged in a common housing of the transmission G in this case, into which the differential gear AG can also be integrated. As is also apparent in FIG. 1, the internal combustion engine VKM, the torsional vibration damper TS, the transmission G, and the differential gear AG are aligned transversely to a direction of travel of the motor vehicle.

Figure 2:
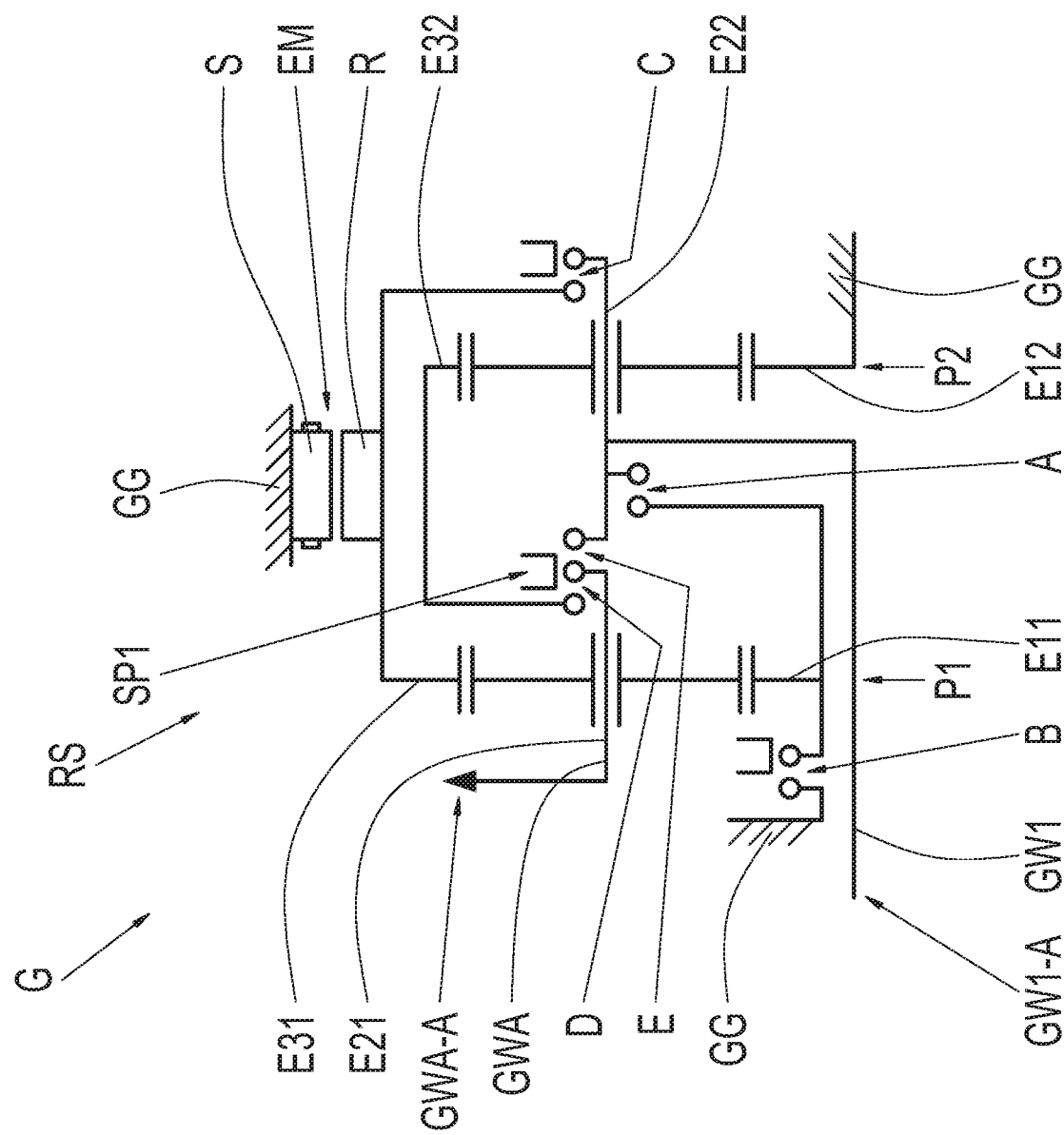
FIGS. 2 through 4 each show a diagrammatic view of a transmission of the type that can be utilized in the motor vehicle drive train from FIG. 1.

FIG. 2 shows a schematic of the transmission G according to a first example embodiment of the invention. As is apparent, the transmission G is composed of a gear set RS and an electric machine EM, which are both arranged in the housing of the transmission G. The gear set RS includes two planetary gear sets P1 and P2, wherein each of the planetary gear sets P1 and P2 includes a first element E11 and E12, respectively, a second element E21 and E22, respectively, and a third element E31 and E32, respectively. The first element E11 and E12 is formed by a sun gear of the planetary gear set P1 and P2, respectively, while the second element E21 and E22 of the planetary gear set P1 and P2, respectively, is present as a planet carrier and the third element E31 and E32 of the planetary gear set P1 and P2, respectively, is present as a ring gear.

In the present case, the first planetary gear set P1 and the second planetary gear set P2 are each therefore present as a negative or minus planetary gear set. The particular planet carrier thereof guides at least one planet gear in a rotatably mounted manner; the planet gear is meshed with the particular radially internal sun gear as well as with the particular radially surrounding ring gear. It is particularly preferred, however, when multiple planet gears are provided in the case of the first planetary gear set P1 as well as in the case of the second planetary gear set P2.

Provided this is permitted by the connection, the first planetary gear set P1 and the second planetary gear set P2 could also each be designed as a positive or plus planetary gear set, wherein, as compared to the design as a negative/minus planetary gear set, the second element E21 and E22, respectively, is then formed by the respective ring gear and the third element E31 and E32, respectively, is formed by the respective planet carrier and, in addition, a respective stationary transmission ratio must be increased by one. In the case of a positive/plus planetary gear set, the planet carrier then guides at least one pair of planet gears in a rotatably mounted manner. One planet gear of said pair of planet gears is meshed with the radially internal sun gear and one planet gear is meshed with the radially surrounding ring gear, and the planet gears intermesh with each other.

As is apparent in FIG. 2, the transmission G includes a total of five shift elements in the form of a first shift element A, a second shift element B, a third shift element C, a fourth shift element D, and a fifth shift element E. The shift elements A, B, C, D and E are each designed as form-locking shift elements and are preferably present as constant-mesh shift elements. In addition, the first shift element A, the third shift element C, the fourth shift element D, and the fifth shift element E are configured as clutches, while the second shift element B is present as a brake.

An input shaft GW1 of the transmission G is rotationally fixed to the second element E22 of the second planetary gear set P2 and, with the aid of the first shift element A, can be connected in a rotationally fixable to the first element E11 of the first planetary gear set P1, which can be rotationally fixed at a rotationally fixed component GG by actuating the second shift element B. The rotationally fixed component GG is, in particular, the transmission housing of the transmission G or a portion of the transmission housing. Moreover, the input shaft GW1 can also be connected in a rotationally fixed manner to the third element E31 of the first planetary gear set P1 by engaging the third shift element C, wherein the third element E31 of the first planetary gear set P1 is continuously rotationally fixed to a rotor R of the electric machine EM. A stator S of the electric machine EM is permanently rotationally fixed at the rotationally fixed component GG.

As is also apparent in FIG. 2, an output shaft GWA of the transmission G is rotationally fixed to the second element E21 of the first planetary gear set P1 and can be connected in a rotationally fixed manner to the third element E32 of the second planetary gear set P2 via the fourth shift element D. In addition, the output shaft GWA can be connected in a rotationally fixed manner to the input shaft GW1 by engaging the fifth shift element E. Finally, the first element E12 of the second planetary gear set P2 is continuously rotationally fixed at the rotationally fixed component GG.

The input shaft GW1 as well as the output shaft GWA form a mounting interface GW1-A and GWA-A, respectively, wherein the mounting interface GW1-A in the motor vehicle drive train from FIG. 1 is utilized for connecting to the internal combustion engine VKM, while the transmission G is connected at the mounting interface GWA-A to the downstream differential gear AG. The mounting interface GW1-A of the input shaft GW1 is formed on an axial end of the transmission G in this case, while the mounting interface GWA-A of the output shaft GWA is situated at the same axial end and, as a result, is aligned transversely to the mounting interface GW1-A of the input shaft GW1. In addition, the input shaft GW1 and the output shaft GWA are arranged coaxially to each other.

The planetary gear sets P1 and P2 are also situated coaxially to the input shaft GW1 and the output shaft GWA, wherein the planetary gear sets P1 and P2 are arranged in the sequence first planetary gear set P1 and second planetary gear set P2 axially subsequent to the mounting interface GW1-A of the input shaft GW1. The electric machine EM is also located coaxially to the planetary gear sets P1 and P2 and, therefore, also to the input shaft GW1 and the output shaft GWA, wherein the electric machine EM is provided axially between the first planetary gear set P1 and the second planetary gear set P2.

As is also apparent from FIG. 2, the first shift element A, the fourth shift element D, and the fifth shift element E are arranged axially between the first planetary gear set P1 and the second planetary gear set P2, wherein, in this case, the fourth shift element D is situated axially adjacent to the first planetary gear set P1, followed axially initially by the fifth shift element E and then the first shift element A. The second shift element B is provided axially on a side of the first planetary gear set P1 facing away from the second planetary gear set P2, whereas the third shift element C is located axially on a side of the second planetary gear set P2 facing away from the first planetary gear set P1.

The fourth shift element D and the fifth shift element E are located axially directly next to each other and radially at the same level and include a common actuating element, with the aid of which the fourth shift element D, on the one hand, and the fifth shift element E, on the other hand, can be actuated from a neutral position. In that respect, the fourth shift element D and the fifth shift element E are combined to form a first shift element pair SP1. However, the further shift elements A, B, and C are each designed as single shift elements.

Figure 3:
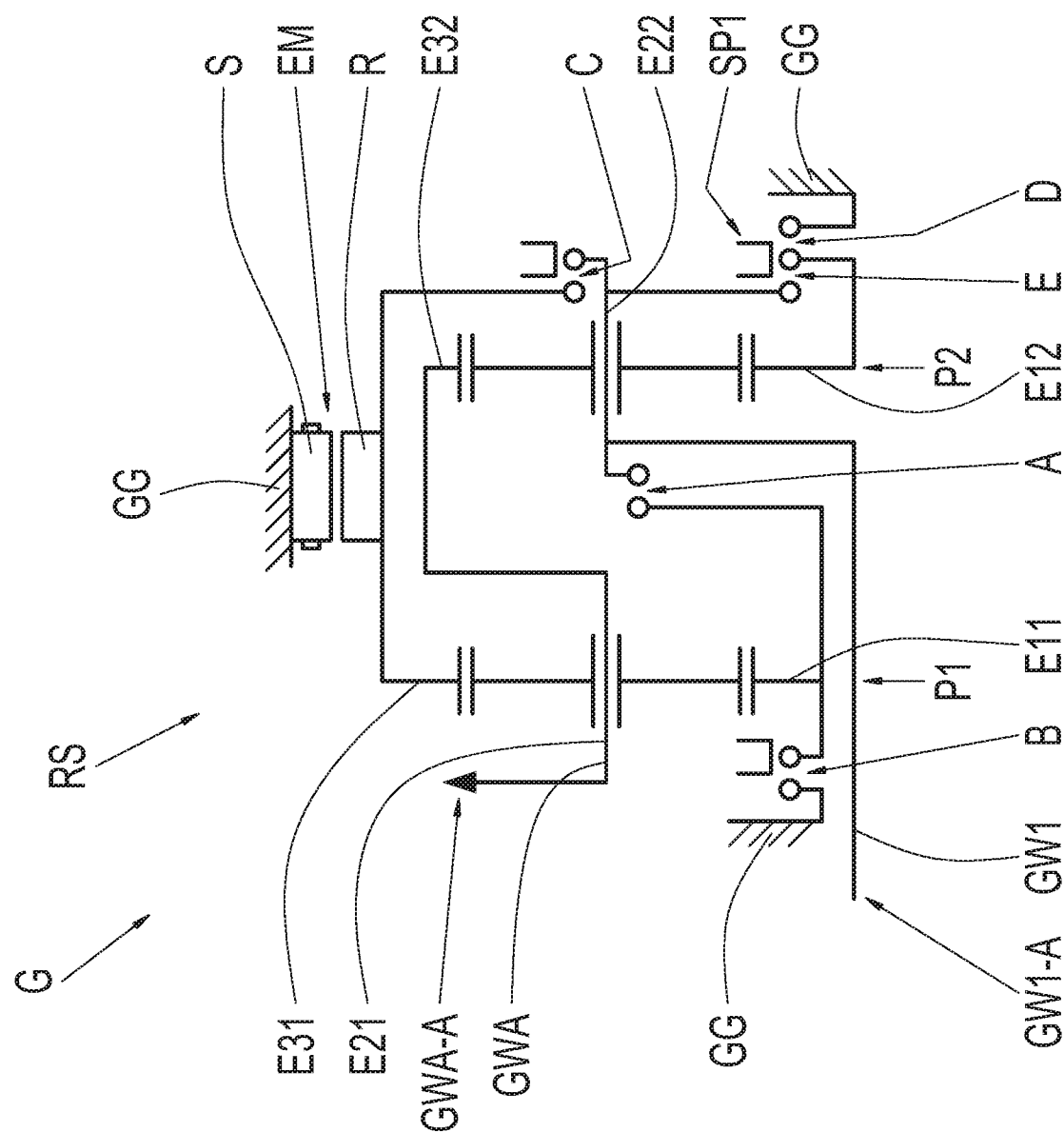

Moreover, FIG. 3 shows a schematic of a transmission G according to a second example embodiment of the invention, of the type that can also be utilized in the motor vehicle drive train in FIG. 1. This example embodiment essentially corresponds to the preceding example variant according to FIG. 2, wherein, in contrast thereto, the third element E32 of the second planetary gear set P2 is now permanently rotationally fixed to the output shaft GWA, while the first element E12 of the second planetary gear set P2 is now not continuously rotationally fixed, but rather is rotationally fixed only by engaging a fourth shift element D at the rotationally fixed component GG. Moreover, a fifth shift element E, upon actuation, connects the first element E12 and the second element E22 of the second planetary gear set P2 to each other in a rotationally fixed manner, which results in an interlock of the second planetary gear set P2. The fourth shift element D is therefore designed as a brake and, together with the fifth shift element E, which is present as a clutch, is provided axially on a side of the second planetary gear set P2 facing away from the first planetary gear set P1. In this case as well, the fourth shift element D and the fifth shift element E are combined to form a first shift element pair SP1. For the rest, the example embodiment according to FIG. 3 corresponds to the example variant according to FIG. 2, and therefore reference is made to the description thereof.

Figure 4:
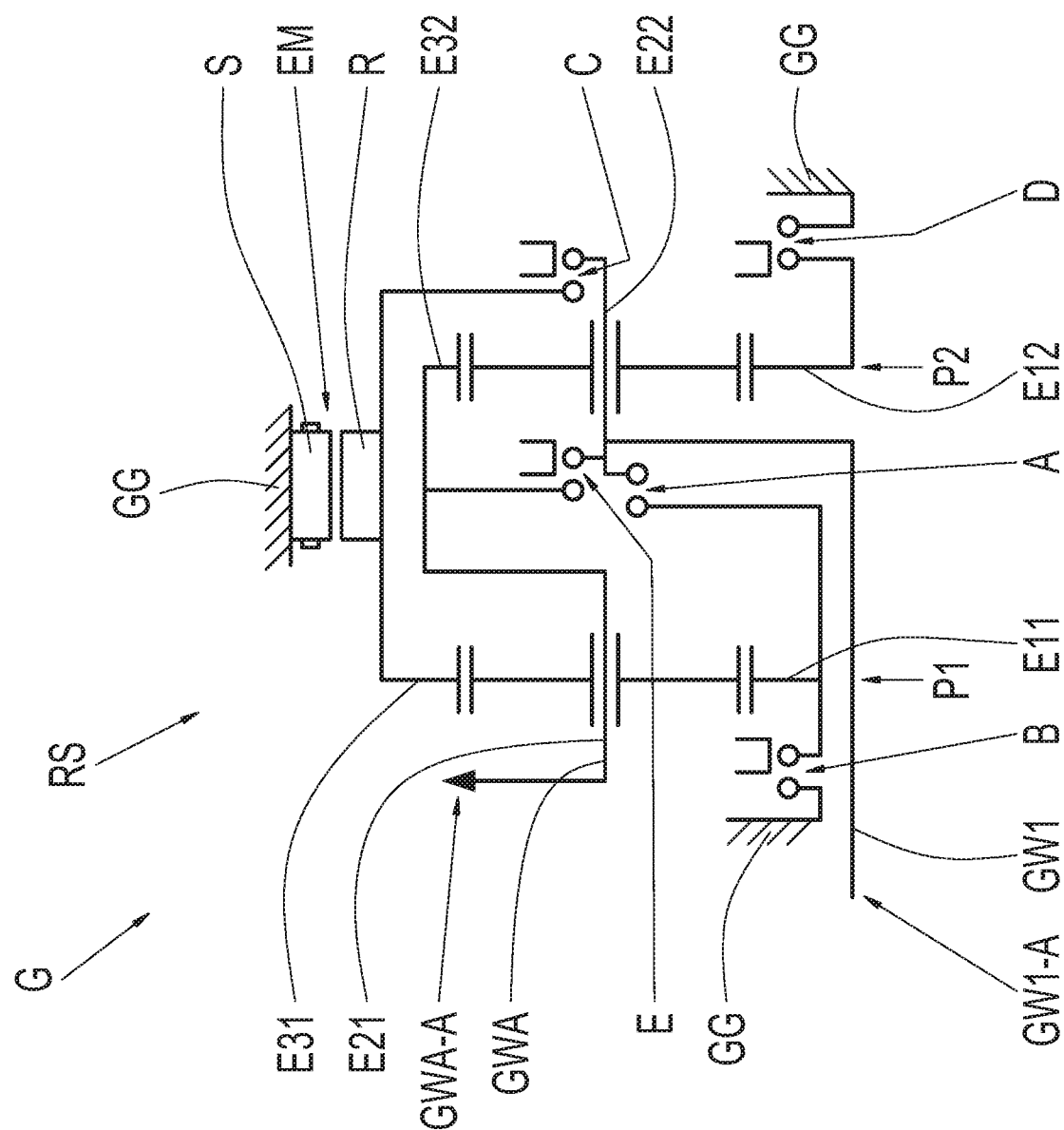

FIG. 4 shows a schematic view of a transmission G according to a third example design option of the invention, wherein this design option largely corresponds to the preceding example variant represented in FIG. 3. This design option can also be utilized in the motor vehicle drive train in FIG. 1. The difference with respect to the example variant according to FIG. 3 is that a fifth shift element E, upon actuation, connects the second element E22 and the third element E32 of the second planetary gear set P2 to each other in a rotationally fixed manner, which results in an interlock of the second planetary gear set P2. The fifth shift element E, which is designed as a clutch, is provided axially between the first planetary gear set P1 and the second planetary gear set P2 and, therefore, is no longer combined with the fourth shift element D to form a shift element pair. In principle, a combination with the first shift element A could be implemented, however. Moreover, the fifth shift element E could be provided axially on a side of the second planetary gear set P2 facing away from the first planetary gear set P1 and, if necessary, combined with the third shift element C to form a shift element pair. Otherwise, the design option according to FIG. 4 corresponds to the example variant according to FIG. 3, and therefore reference is made to the description thereof.

FIG. 5 shows an exemplary shift pattern for the transmissions G from FIGS. 2 through 4 in table form. As is apparent, a total of three gears 1 through 3.4 can be implemented between the input shaft GW1 and the output shaft GWA in this case, wherein, in the columns of the shift pattern, an X indicates which of the shift elements A through E is engaged in which of the gears 1 through 3.4.

As is apparent in FIG. 5, a first gear 1 is implemented between the input shaft GW1 and the output shaft GWA by actuating the second shift element B and the third shift element C. Moreover, a second gear is selected between the input shaft GW1 and the output shaft GWA in a first example variant 2.1 by actuating the second shift element B and the fifth shift element E, wherein the second gear also results in a second example variant 2.2 by actuating the first shift element A and the fifth shift element E, in a third example variant 2.3 by engaging the third shift element C and the fifth shift element E, in a fourth example variant 2.4 by actuating the first shift element A and the third shift element C, and in a fifth example variant 2.5 by engaging the fifth shift element E. While the electric machine EM is integrated in each of the first four example variants 2.1 through 2.4, so that driving can take place in a hybrid manner while simultaneously utilizing the internal combustion engine VKM, the electric machine EM is decoupled in the case of the last example variant 2.5. As a result, zero-load losses of the electric machine EM can be avoided, while the input shaft GW1 is directly connected to the output shaft GWA in a rotationally fixed manner via the fifth shift element E.

A third gear between the input shaft GW1 and the output shaft GWA is selected in a first example variant 3.1 by actuating the second shift element B and the fourth shift element D, wherein the third gear also results in a second example variant 3.2 by engaging the first shift element A and the fourth shift element D, in a third example variant 3.3 by actuating the third shift element C and the fourth shift element D, and in a fourth example variant 3.4 by engaging the fourth shift element D. While the electric machine EM is integrated in each of the example variants 3.1, 3.2, and 3.3, so that driving can take place in a hybrid manner while simultaneously utilizing the internal combustion engine VKM, the electric machine EM is decoupled in the case of the fourth example variant 3.4 of the third gear. The latter has the advantage that the electric machine EM does not need to rotate during the operation and, therefore, zero-load losses can be avoided.

Although the shift elements A through E are each designed as a form-locking shift element, a shift between the first gear 1 and the first example variant 2.1 of the second gear can be implemented under load, since the second shift element B contributes to each of these. A powershift can also be implemented between the first example variant 2.1 of the second gear and the first example variant 3.1 of the third gear, since the second shift element B is engaged in each of these cases as well. A synchronization during the gear shifts can take place in each case with the aid of an appropriate closed-loop control of the upstream internal combustion engine VKM, and therefore the particular shift element to be disengaged is disengaged without load and the shift element to be subsequently engaged can be engaged without load.

The transmissions G from FIGS. 2 through 4 can also be operated in alternative operating modes with the aid of the electric machine EM. Purely electric driving can take place in a first gear E1, which is effective between the rotor R of the electric machine EM and the output shaft GWA and, for the implementation of which, the second shift element B is to be transferred into an engaged condition. As a result, the rotor R is coupled to the output shaft GWA via the first planetary gear set P1, wherein the ratio of the first gear E1 corresponds, in this case, to the ratio of the first gear 1, which is effective between the input shaft GW1 and the output shaft GWA.

Advantageously, starting from the first gear E1, a start of the internal combustion engine VKM can take place into the first gear 1, into the first example variant 2.1 of the second gear, and also into the first example variant 3.1 of the third gear, since the second shift element B is also engaged in each of these gears. Therefore, a transition from purely electric driving into driving with the aid of the internal combustion engine or into hybrid driving can be carried out rapidly.

Moreover, a charging or starting function can be implemented by engaging the third shift element C. This is the case because, in the engaged condition of the third shift element C, the rotor R of the electric machine EM is directly connected to the input shaft GW1 in a rotationally fixed manner and, therefore, also to the internal combustion engine VKM. At the same time, there is no force-fit connection to the output shaft GWA, however, wherein the rotor R and the input shaft GW1 rotate at the same rotational speed in this case. When the electric machine EM is operated as a generator, an electric accumulator can be charged via the internal combustion engine VKM, whereas, when the electric machine EM is operated as an electric motor, a start of the internal combustion engine VKM can be implemented via the electric machine EM.

A starting function for forward travel EDA-V can also be implemented as yet another operating mode. For this purpose, the first shift element A is to be engaged, whereby driving takes place via the input shaft GW1 with the aid of the first element E11 of the first planetary gear set P1, while the electric machine EM can support the torque of the internal combustion engine VKM at the third element E31 of the first planetary gear set P1. An output to the output shaft GWA then takes place via the second element E21 of the first planetary gear set P1. As a result, a starting operation for forward travel can be implemented.

In addition, a rotational-speed reduction of the electric machine EM can be configured in the mechanical or hybrid mode. After a gear shift from the second gear into the third gear, with torque support via the electric machine EM, or after a start of the internal combustion engine VKM into the third gear, hybrid driving in the first example variant 3.1 of the third gear results. In order to reduce the rotational speed of the electric machine EM in the third gear at higher ground speeds, a change-over can be carried out from the first example variant 3.1 of the third gear into the second example variant 3.2, in which the rotor R has a lower rotational speed. This change-over takes place while obtaining the tractive force via the internal combustion engine VKM with the fourth shift element D engaged. For this purpose, the second shift element B, which is then load-free, is disengaged and the likewise load-free, first shift element A is engaged, wherein the rotational-speed adaptation takes place in each case with the aid of closed-loop control of the rotational speed of the electric machine EM.

Figure 6:
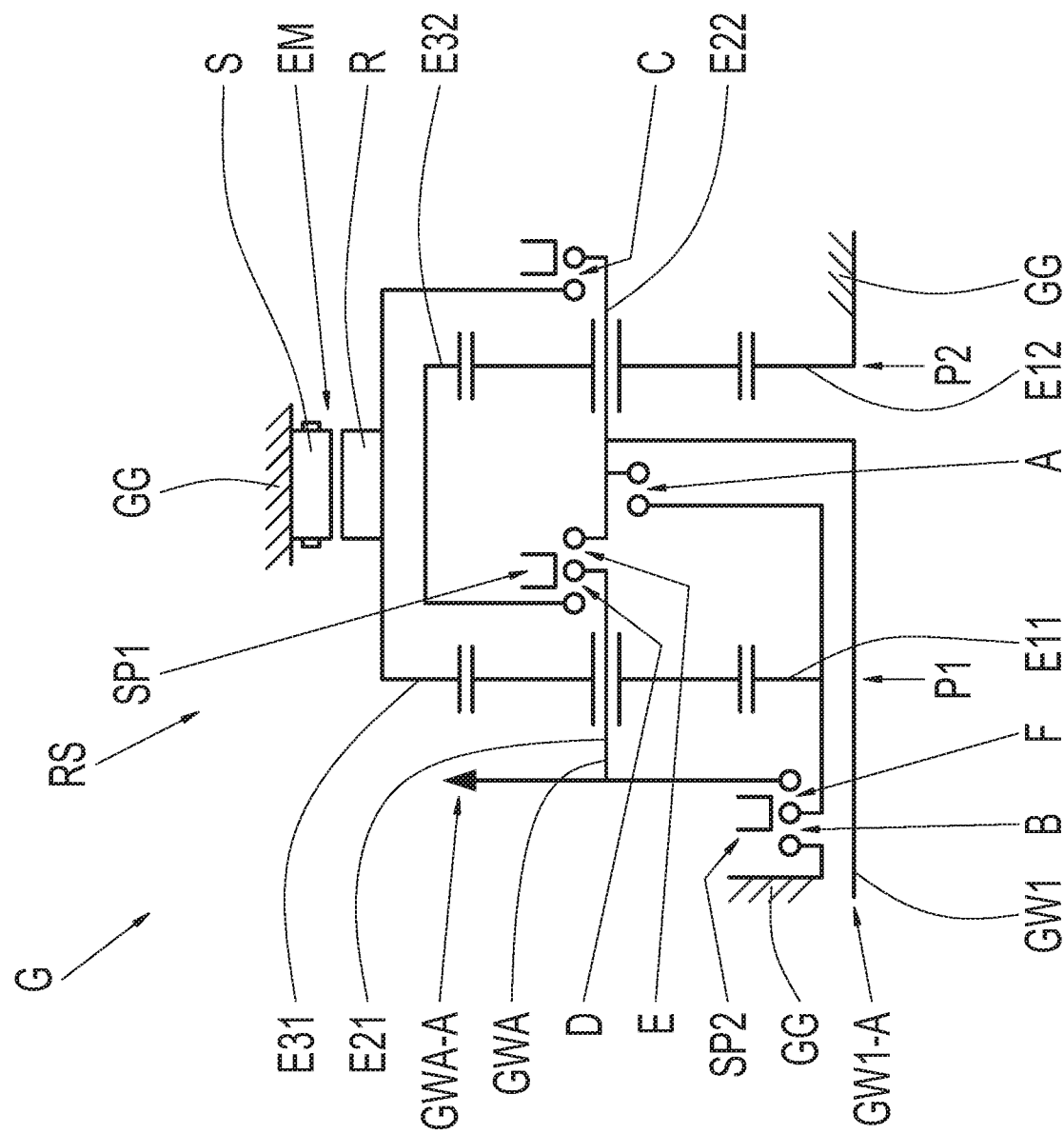
FIGS. 6 through 8 each show a schematic of a transmission of the type that can also be utilized in the motor vehicle drive train from FIG. 1.

Moreover, FIG. 6 shows a schematic of a transmission G according to a fourth example embodiment of the invention, which can also be utilized in the motor vehicle drive train in FIG. 1 and largely corresponds to the example variant according to FIG. 2. The difference in this case, however, is that a sixth shift element F is now additionally provided, which, upon actuation, connects, in a rotationally fixed manner, the first element E11 of the first planetary gear set P1 to the output shaft GWA and, therefore, also to the second element E21 of the first planetary gear set P1, so that the first planetary gear set P1 is interlocked. The sixth shift element F is provided, in this case, axially on a side of the first planetary gear set P1 facing away from the second planetary gear set P2 and, specifically, is situated axially between the second shift element B and the first planetary gear set P1. The second shift element B and the sixth shift element F are arranged axially directly next to each other and are combined to form a second shift element pair SP2, in that the second shift element B, on the one hand, and the sixth shift element F, on the other hand, can be actuated via a common actuating element. Otherwise, the example embodiment according to FIG. 6 corresponds to the example variant according to FIG. 2, and therefore reference is made to the description thereof.

Figure 7:
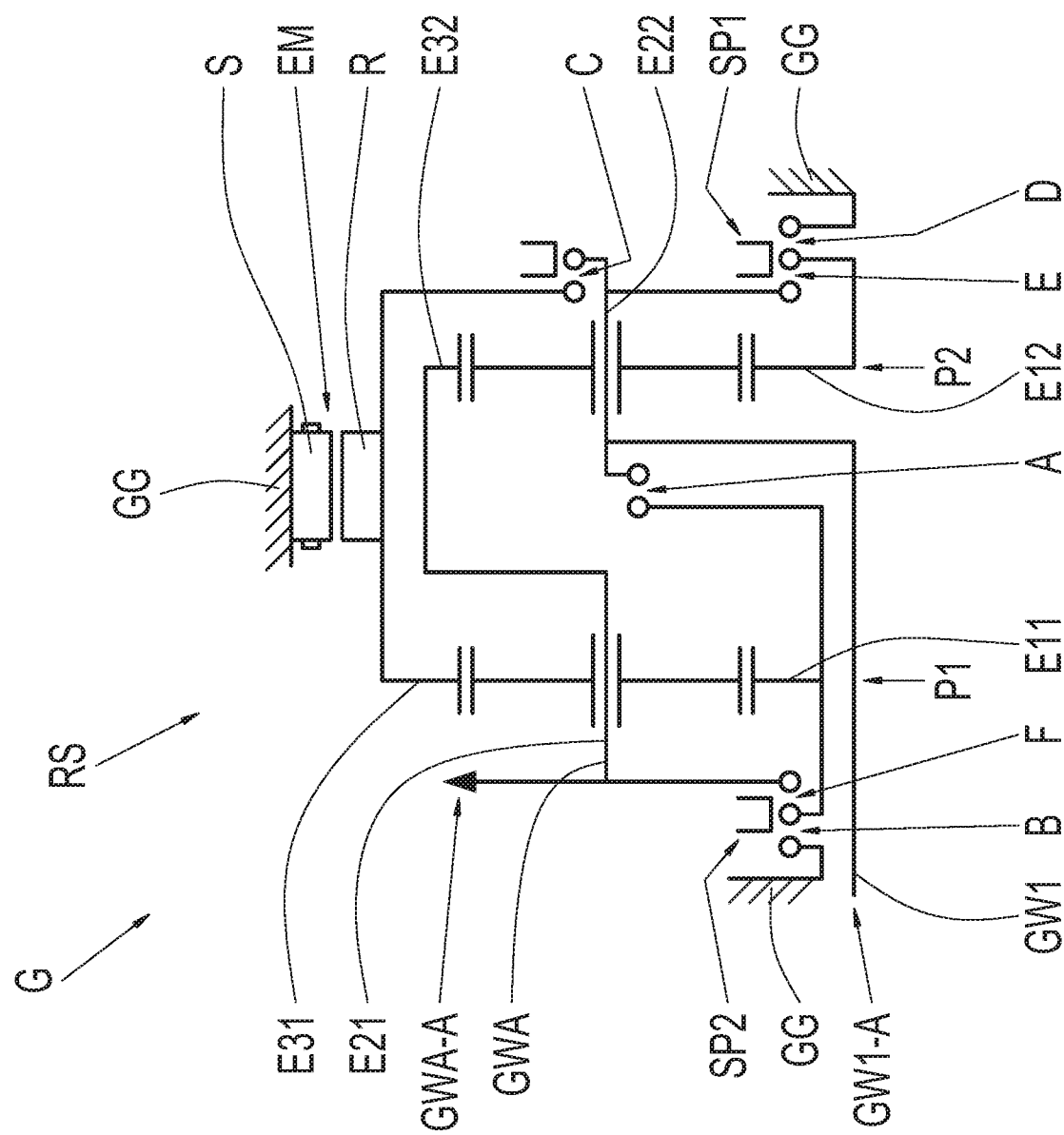

FIG. 7 shows a diagrammatic view of a transmission G according to a fifth example design option of the invention. The transmission G shown in FIG. 7 can also be utilized in the motor vehicle drive train in FIG. 1, wherein the design option largely corresponds to the preceding example variant according to FIG. 6. In contrast to the example embodiment according to FIG. 6, the third element E32 of the second planetary gear set P2 is now continuously rotationally fixed to the output shaft GWA, whereas the first element E12 of the second planetary gear set P2 is now not continuously rotationally fixed, but rather is rotationally fixed only by engaging a fourth shift element D at the rotationally fixed component GG. Moreover, a fifth shift element E, upon actuation, connects the first element E12 and the second element E22 of the second planetary gear set P2 to each other in a rotationally fixed manner and, as a result, ensures that the second planetary gear set P2 is interlocked. The fourth shift element D, which is designed as a brake, as well as the fifth shift element E, which is present as a clutch, are provided axially on a side of the second planetary gear set P2 facing away from the first planetary gear set P1, wherein the fifth shift element E is arranged axially essentially at the level of the third shift element C and axially between the second planetary gear set P2 and the fourth shift element D. In this case as well, the fourth shift element D and the fifth shift element E are combined to form a first shift element pair SP1. For the rest, the design option according to FIG. 7 corresponds to the example variant according to FIG. 6, and therefore reference is made to the description thereof.

Figure 8:
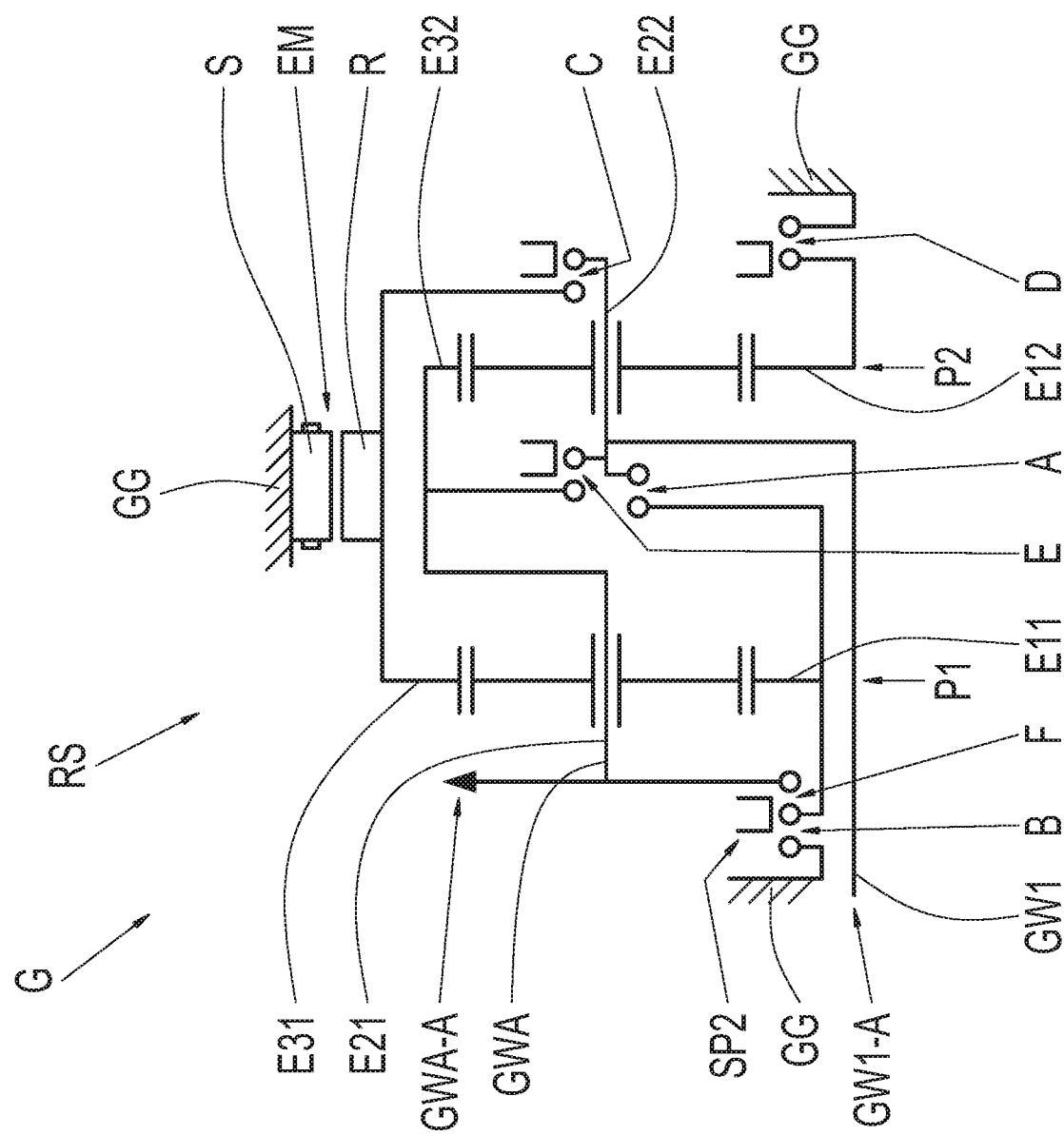

FIG. 8 shows a schematic of a transmission G according to a sixth example embodiment of the invention, wherein this example embodiment largely corresponds to the preceding example variant according to FIG. 7. This design option can also be utilized in the motor vehicle drive train in FIG. 1. The difference with respect to the example variant according to FIG. 7 is that a fifth shift element E, upon actuation, now connects the second element E22 and the third element E32 of the second planetary gear set P2 to each other in a rotationally fixed manner, which results in an interlock of the second planetary gear set P2. The fifth shift element E, which is designed as a clutch, is provided axially between the first planetary gear set P1 and the second planetary gear set P2 and, therefore, is no longer combined with the fourth shift element D to form a shift element pair. In principle, a combination with the first shift element A could be implemented in this case, however. Moreover, the fifth shift element E could also be provided axially on a side of the second planetary gear set P2 facing away from the first planetary gear set P1 and, if necessary, combined with the third shift element C to form a shift element pair. Otherwise, the design option according to FIG. 8 corresponds to the example variant according to FIG. 7, and therefore reference is made to the description thereof.

FIG. 9 shows an exemplary shift pattern of the transmissions from FIGS. 6 through 8, wherein this shift pattern essentially corresponds to the shift pattern from FIG. 5. The difference in this case is that, due to the additional provision of the sixth shift element F, further example variants 2.6, 2.7, and 2.8 of the second gear, which is effective between the input shaft GW1 and the output shaft GWA, and one further example variant 3.5 of the third gear, which is effective between the input shaft GW1 and the output shaft GWA, can be implemented. In this way, a sixth example variant 2.6 of the second gear results by engaging the fifth shift element E and the sixth shift element F, while a seventh example variant 2.7 can be selected by actuating the first shift element A and the sixth shift element F as well as an eighth example variant 2.8 by engaging the third shift element C and the sixth shift element F. A fifth example variant 3.5 of the third gear results by actuating the fourth shift element D and the sixth shift element F.

In addition, a second gear E2 can be implemented between the second input shaft GW2 and the output shaft GWA, for the implementation of which the sixth shift element F is to be engaged. As a result, the output shaft GWA is connected to the rotor R of the electric machine EM in a rotationally fixed manner via the second planetary gear set P2, which is then interlocked. A ratio of this gear E2 corresponds to the ratio of the second gear between the input shaft GW1 and the output shaft GWA.

In addition, a rotational-speed reduction of the rotor R of the electric machine EM can be implemented by changing over from the first example variant 3.1 of the third gear into the fifth example variant 3.5: After an electrically-assisted gear shift from the second gear into the third gear, or after a start of the internal combustion engine VKM into the third gear, hybrid driving initially results in the first example variant 3.1 of the third gear. In order to reduce the rotational speed of the rotor in the third gear at higher ground speeds, a change-over is now carried out from the first example variant 3.1 into the fifth example variant 3.5, since the rotor has a lower rotational speed in this case than in the first example variant 3.1. This change-over takes place while obtaining the tractive force via the internal combustion engine VKM, wherein the load-free, second shift element B is disengaged and the likewise load-free, sixth shift element F is engaged, accompanied by rotational-speed adaptation with the aid of closed-loop control of the rotational speed of the electric machine.

The change-over into the fifth example variant 3.5 also has the advantage that the internal combustion engine VKM can be decoupled at any time by disengaging the fourth shift element D even in the absence of an additional separating clutch, while the electric machine EM drives or decelerates the vehicle. Moreover, in the case of a vehicle that is slowing down, a downshift from the third gear into the second gear can be prepared, in that, initially, a change-over takes place from the fifth example variant 3.5 into the first example variant 3.1, while the internal combustion engine VKM obtains the tractive force with the fourth shift element D engaged. In the first example variant 3.1 of the third gear, the second shift element B is engaged, which becomes necessary in order to support the tractive force via the electric machine EM during the downshift from the third gear into the second gear.

In the case of the transmissions G according to FIGS. 6 through 8, alternatively, a modification can also be implemented in each, in which a sixth shift element, upon actuation, connects the second element and the third element of the first planetary gear set to each other in a rotationally fixed manner, since this also results in an interlock of the first planetary gear set. Provided this is made possible by an arrangement of the sixth shift element, a rotationally fixed connection of the first element and of the third element of the first planetary gear set could just as well be carried out upon actuation of a sixth shift element.

Figure 10:
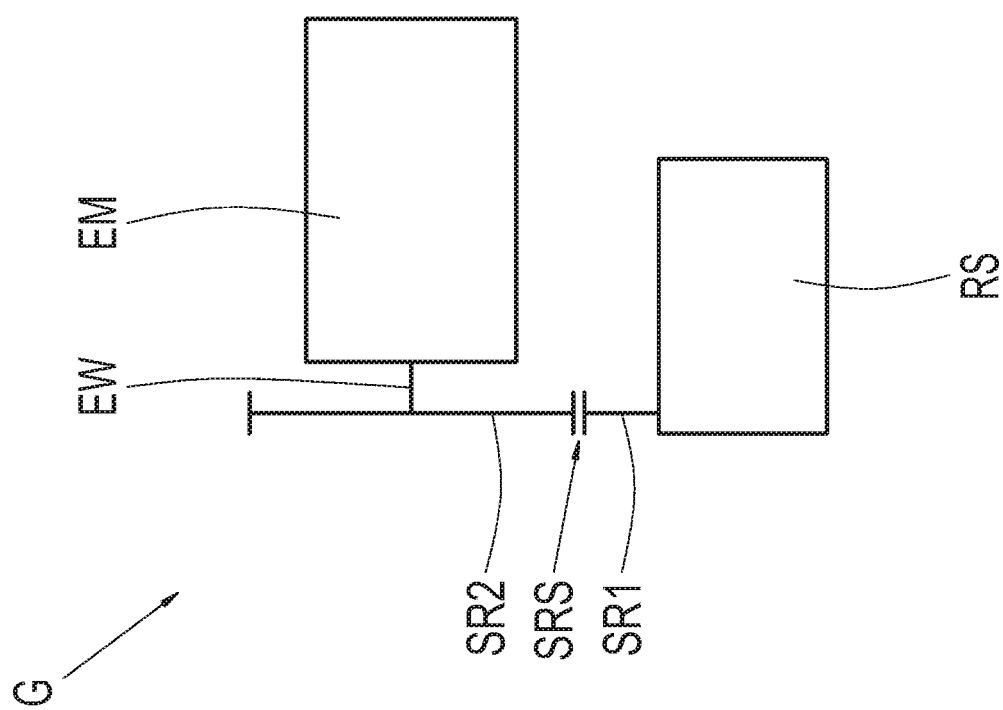

Finally, FIGS. 10 through 15 show modifications of the transmissions G from FIGS. 2 through 4 and 6 through 8. These modifications relate to alternative options for integrating the electric machine EM. In FIG. 10, the electric machine EM is not located coaxially to the particular gear set RS (not represented in greater detail here) of the transmission G, but rather is arranged axially offset with respect thereto. A connection takes place, in this case, via a spur gear stage SRS, which is composed of a first spur gear SR1 and a second spur gear SR2. The first spur gear SR1 is connected, by the gear set RS in the case of the transmissions G according to FIGS. 2 through 4 and 6 through 8, in a rotationally fixed manner at the third element E31 of the first planetary gear set P1. The spur gear SR1 then meshes with the spur gear SR2, which is located on an input shaft EW of the electric machine EM1 in a rotationally fixed manner, which establishes, within the electric machine EM, the connection to the rotor (not represented further in this case) of the electric machine EM.

Figure 11:
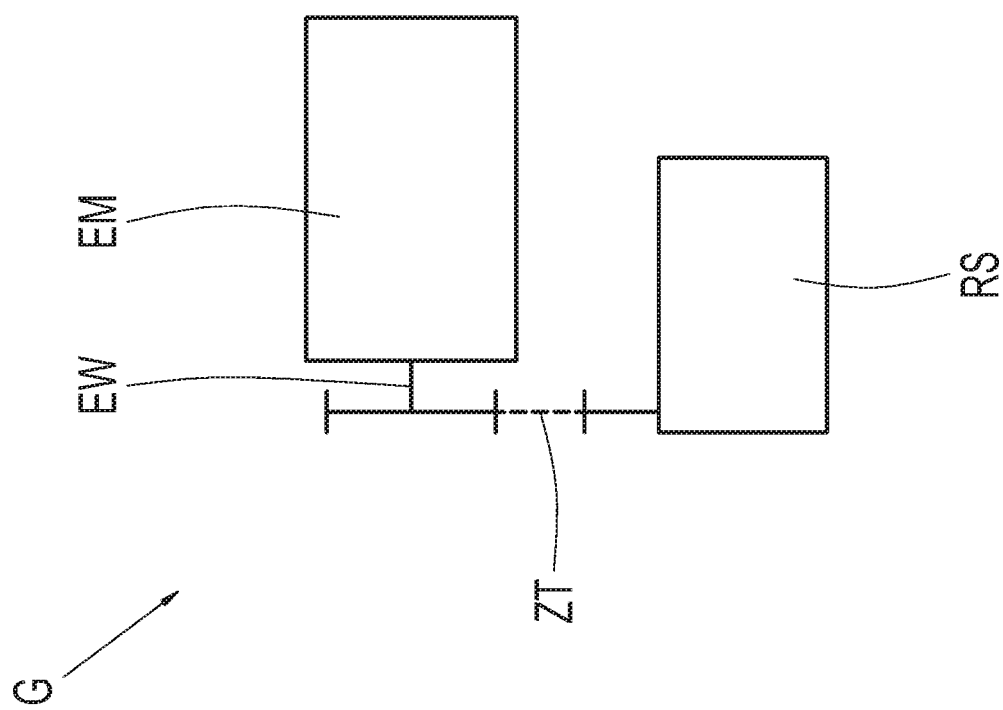

In the case of the modification according to FIG. 11 as well, the electric machine EM is located axially offset with respect to the particular gear set RS of the particular transmission G. In contrast to the preceding example variant according to FIG. 10, a connection is not established in this case via a spur gear stage, however, but rather via a flexible traction drive mechanism ZT. This flexible traction drive mechanism ZT can be configured as a belt drive or even a chain drive in this case. In the case of the transmissions G according to FIGS. 2 through 4 and 6 through 8, the flexible traction drive mechanism ZT is then connected by the gear set RS in a rotationally fixed manner at the third element E31 of the first planetary gear set P1. Via the flexible traction drive mechanism ZT, a coupling to the input shaft EW of the electric machine EM is then established, which, in turn, establishes a connection to the rotor of the electric machine, within the electric machine EM.

Figure 12:
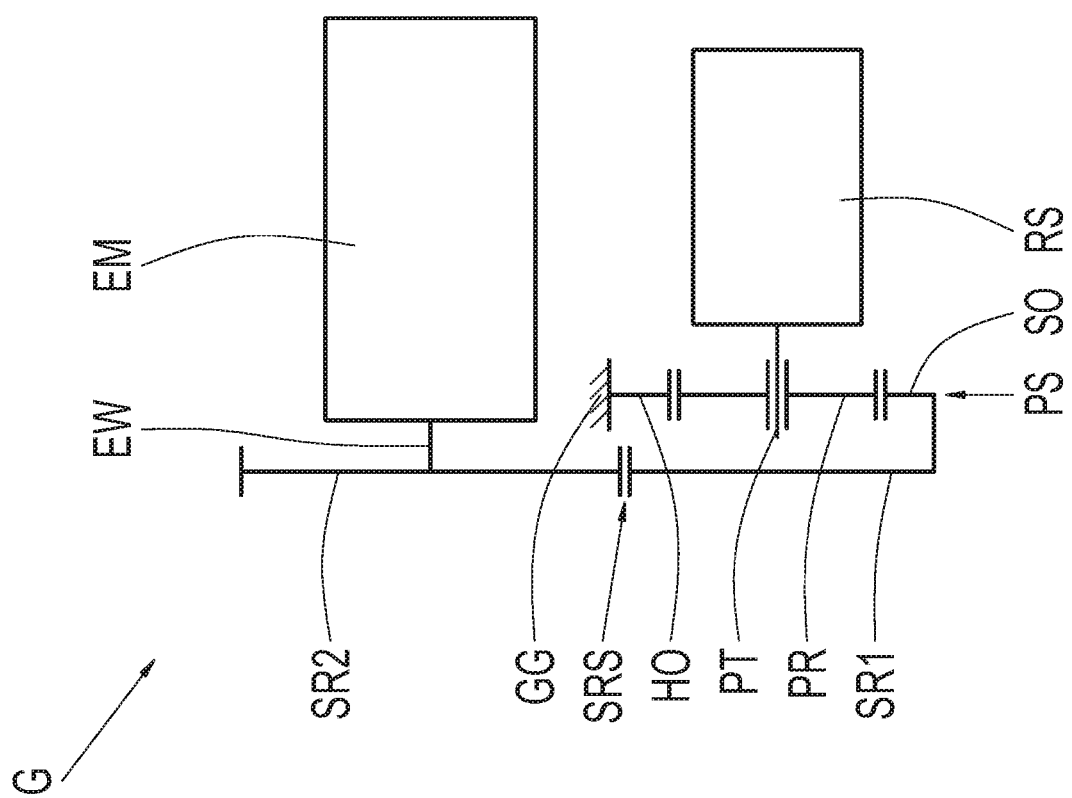

In the case of the modification according to FIG. 12, an integration of the electric machine EM, which is located axially offset with respect to the particular gear set RS, is implemented via a planetary gear stage PS and a spur gear stage SRS. The planetary gear stage PS is connected downstream from the gear set RS, wherein, on the output end of the planetary gear stage PS, the spur gear stage SRS is then provided, via which the connection to the electric machine EM is established. The planetary gear stage PS is composed of a ring gear HO, a planet carrier PT, and a sun gear SO, wherein the planet carrier PT guides, in a rotatably mounted manner, at least one planet gear PR, which is meshed with the sun gear SO as well as with the ring gear HO.

In the present case, the planet carrier PT is connected by the gear set RS, in the case of the transmissions G according to FIGS. 2 through 4 and 6 through 8, in a rotationally fixed manner at the third element E31 of the first planetary gear set P1. By comparison, the ring gear HO is permanently rotationally fixed at the rotationally fixed component GG, while the sun gear SO is rotationally fixed to a first spur gear SR1 of the spur gear stage SRS. The first spur gear SR1 then intermeshes with a second spur gear SR2 of the spur gear stage SRS, which is provided, in a rotationally fixed manner, on an input shaft EW of the electric machine EM. In this case, the electric machine EM is therefore connected by the gear set RS via two transmission ratio steps.

Figure 13:
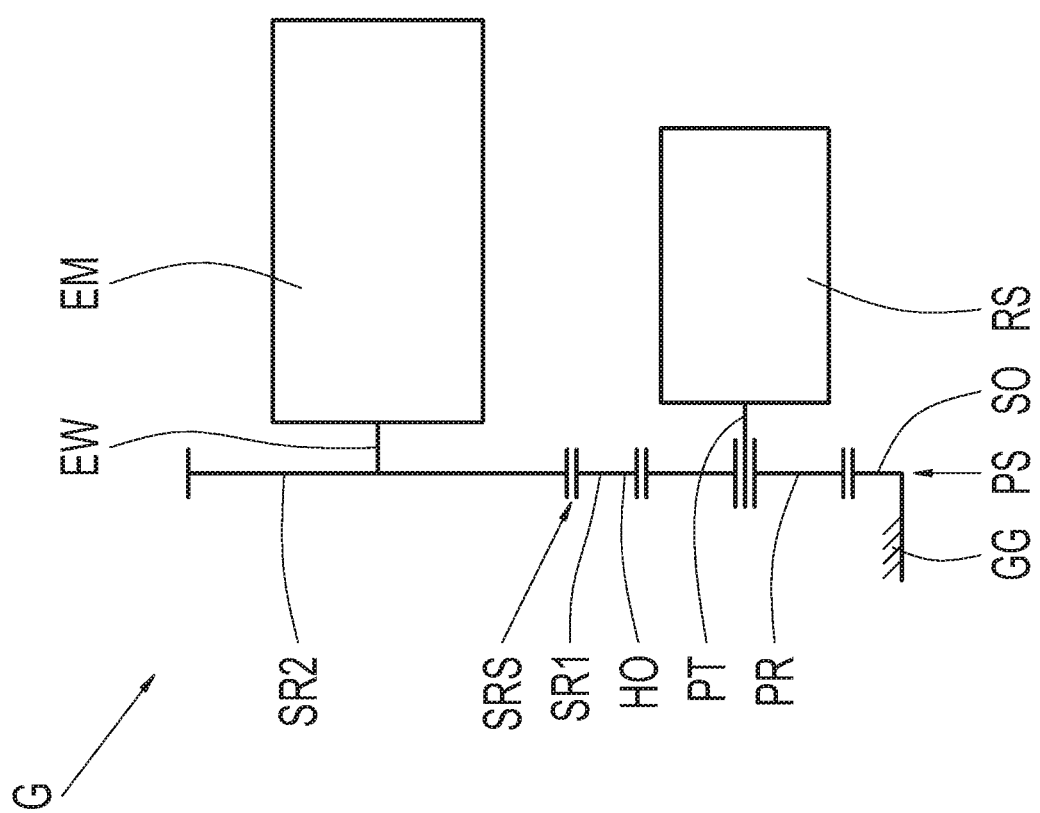

In the case of the modification from FIG. 13 as well, an integration of the electric machine EM is implemented by the gear set RS via a planetary gear stage PS and a spur gear stage SRS. The modification largely corresponds to the example variant according to FIG. 12, with the difference that, with respect to the planetary gear stage PS, the sun gear SO is now rotationally fixed at the rotationally fixed component GG, while the ring gear HO is rotationally fixed to the first spur gear SR1 of the spur gear stage SRS. Specifically, the ring gear HO and the first spur gear SR1 are preferably designed as one piece, in that the ring gear HO is equipped, on an outer circumference, with a tooth system. For the rest, the modification according to FIG. 13 corresponds to the example variant according to FIG. 12, and therefore reference is made to the description thereof.

Figure 14:
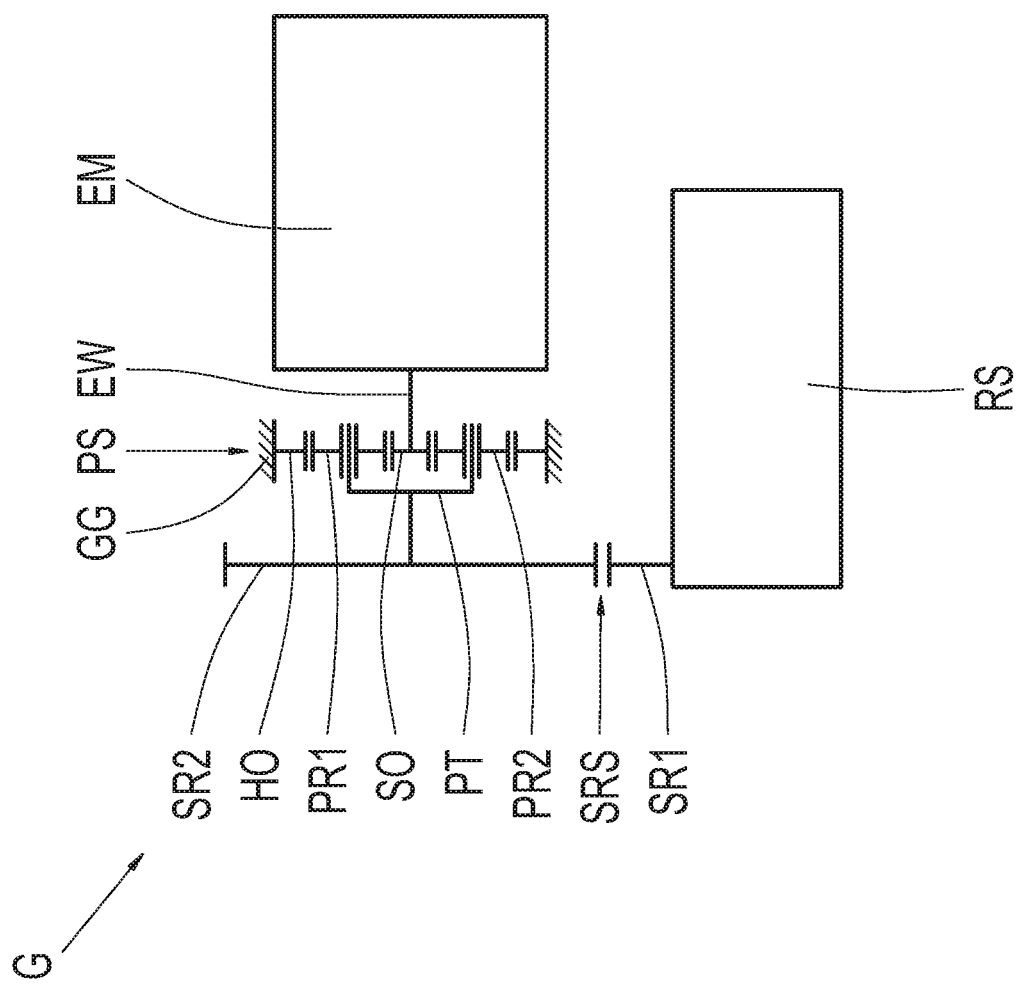

Moreover, FIG. 14 shows one further modification of the transmissions G from FIGS. 2 through 4 and 6 through 8, wherein, in this case as well, an integration of the electric machine EM is implemented via a spur gear stage SRS and a planetary gear stage PS. In contrast to the preceding example variant according to FIG. 13, the gear set RS is initially followed, in this case, by the spur gear stage SRS, while the planetary gear stage PS is provided in the power flow between the spur gear stage SRS and the electric machine EM. The planetary gear stage PS also includes, once again, the elements ring gear HO, planet carrier PT, and sun gear SO, wherein the planet carrier PT guides, in a rotatably mounted manner, multiple planet gears PR1 and PR2, each of which is meshed with the sun gear SO as well as with the ring gear HO.

As is apparent in FIG. 14, a first spur gear SR1 of the spur gear stage SRS is connected in a rotationally fixed manner by the gear set RS, wherein, in the case of the transmissions G according to FIGS. 2 through 4 and 6 through 8, this connection is implemented in a rotationally fixed manner at the third element E31 of the first planetary gear set P1. The first spur gear SR1 then intermeshes with a second spur gear SR2 of the spur gear stage SRS, which is rotationally fixed to the planet carrier PT of the planetary gear stage PS. The ring gear HO is permanently rotationally fixed at the rotationally fixed component GG, while the sun gear SO is provided, in a rotationally fixed manner, on an input shaft EW of the electric machine EM.

Finally, FIG. 15 shows one further modification of the transmission G from FIGS. 2 through 4 and 6 through 8, wherein this modification essentially corresponds to the preceding example variant according to FIG. 14. The only difference in this case is that the sun gear SO of the planetary gear stage PS is now permanently rotationally fixed at the rotationally fixed component GG, while the ring gear HO of the planetary gear stage PS is rotationally fixed to the input shaft EW of the electric machine EM. For the rest, the modification according to FIG. 15 corresponds to the example variant according to FIG. 14, and therefore reference is made to the description thereof.

By means of the embodiments according to example aspects of the invention, a transmission having a compact design and good efficiency can be implemented.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

G transmission
RS gear set

GG rotationally fixed component
P1 first planetary gear set
E11 first element of the first planetary gear set
E21 second element of the first planetary gear set
E31 third element of the first planetary gear set
P2 second planetary gear set
E12 first element of the second planetary gear set
E22 second element of the second planetary gear set
E32 third element of the second planetary gear set
A first shift element
B second shift element
C third shift element
D fourth shift element
E fifth shift element
F sixth shift element
SP1 first shift element pair
SP2 second shift element pair
first gear
2.1 second gear
2.2 second gear
2.3 second gear
2.4 second gear
2.5 second gear
2.6 second gear
2.7 second gear
2.8 second gear
3.1 third gear
3.2 third gear
3.3 third gear
3.4 third gear
3.5 third gear
E1 first gear
E2 second gear
EDA-V starting mode for forward travel
GW1 input shaft
GW1-A mounting interface
GWA output shaft
GWA-A mounting interface
EM electric machine
S stator
R rotor
SRS spur gear stage
SR1 spur gear
SR2 spur gear
PS planetary gear stage
HO ring gear
PT planet carrier
PR planet gear
PR1 planet gear
PR2 planet gear
SO sun gear
ZT flexible traction drive mechanism
VKM internal combustion engine
TS torsional vibration damper
AG differential gear
DW driving wheels

The invention claimed is:

1. A transmission (G) for a motor vehicle, comprising:
an electric machine (EM);
an input shaft (GW1); an output shaft (GWA);
a first planetary gear set (P1) and a second planetary gear set (P2), each of the first and second planetary gear sets (P1, P2) comprising a first element (E11, E12), a second element (E21, E22), and a third element (E31, E32), the first element (E11, E12) formed by a sun gear of the respective planetary gear set, the second element (E21, E22) formed by a carrier when the respective planetary gear set is a minus planetary gear set or by a ring gear when the respective planetary gear set is a positive gear set, the third element (E31, 32) formed by the ring gear when the respective planetary gear set is the minus planetary gear set or by the carrier when the respective planetary gear set is the positive planetary gear set; and
a first shift element (A), a second shift element (B), a third shift element (C), a fourth shift element (D), and a fifth shift element (E),
wherein the electric machine (EM) is connected to the input shaft (GW1), to the output shaft (EWA), or to at least one of the elements (E11, E21, E31, E12, E22, E32) of the planetary gear sets (P1, P2),
wherein the input shaft (GW1) is connectable in a rotationally fixed manner via the first shift element (A) to the first element (E11) of the first planetary gear set (P1), and the first element (E11) of the first planetary gear set (P1) is rotationally fixable with the second shift element (B),
wherein the input shaft (GW1) is also rotationally fixed to the second element (E22) of the second planetary gear set (P2),
wherein the output shaft (GWA) is rotationally fixed to the second element (E21) of the first planetary gear set (P1), and
wherein the input shaft (GW1) is connectable in a rotationally fixed manner via the third shift element (C) to the third element (E31) of the first planetary gear set (P1).

2. The transmission (G) of claim 1, wherein the first element (E12) of the second planetary gear set (P2) is rotationally fixed, the output shaft (GWA) is connectable in a rotationally fixed manner with the fourth shift element (D) to the third element (E32) of the second planetary gear set, and the output shaft (GWA) is rotationally fixable via the fifth shift element (E) to the input shaft (GW1).

3. The transmission (G) of claim 2, wherein, by selectively engaging the first, second, third, fourth, and fifth elements (A, B, C, D, E):
a first gear (1) results between the input shaft (GW1) and the output shaft (GWA) by actuating the second shift element (B) and the third shift element (C);
a second gear results between the input shaft (GW1) and the output shaft (GWA) in a first variant (2.1) by engaging the second shift element (B) and the fifth shift element (E), in a second variant (2.2) by actuating the first shift element (A) and the fifth shift element (E), in a third variant (2.3) by engaging the third shift element (C) and the fifth shift element (E), in a fourth variant (2.4) by actuating the first shift element (A) and the third shift element (C), and in a fifth variant (2.5) by engaging the fifth shift element (E); and
a third gear results between the input shaft (GW1) and the output shaft (GWA) in a first variant (3.1) by engaging the second shift element (B) and the fourth shift element (D), in a second variant (3.2) by engaging the first shift element (A) and the fourth shift element (D), in a third variant (3.3) by actuating the third shift element (C) and the fourth shift element (D), and in a fourth variant (3.4) by engaging the fourth shift element (D).

4. The transmission (G) of claim 3, further comprising a sixth shift element (F), wherein:
the sixth shift element (F), upon actuation, connects two of the three elements (E11, E21, E31) of the first planetary gear set (P1) to each other in a rotationally fixed manner, the second gear also results between the input shaft (GW1) and the output shaft (GWA) in a sixth variant (2.6) by engaging the fifth shift element (E) and the sixth shift element (F), in a seventh variant (2.7) by actuating the first shift element (A) and the sixth shift element (F), and in an eighth variant (2.8) by engaging the third shift element (C) and the sixth shift element (F), and the third gear results between the input shaft (GW1) and the output shaft (GWA) in a fifth variant (3.5) by actuating the fourth shift element (D) and the sixth shift element (F).

5. The transmission (G) of claim 2, wherein the fourth shift element (D) and the fifth shift element (E) are combined to form a shift element pair (SP1) with an associated actuating element, and wherein the actuating element is configured for actuating either the fourth shift element (D) or the fifth shift element (E) from a neutral position.

6. The transmission (G) of claim 5, wherein the second shift element (D) and the sixth shift element (F) are combined to form a shift element pair (SP2) with an associated actuating element, and wherein the actuating element is configured to actuate either the second shift element (B) or the sixth shift element (F) from a neutral position.

7. The transmission (G) of claim 1, wherein the third element (E32) of the second planetary gear set (P2) is rotationally fixed to the output shaft (GWA), the first element (E12) of the second planetary gear set (P2) is rotationally fixable via the fourth shift element (D), and the first element (E12) and the second element (E22) of the second planetary gear set (P2) or the second element (E22) and the third element (E32) of the second planetary gear set (P2) are connectable to each other in a rotationally fixed manner with the fifth shift element (E).

8. The transmission (G) of claim 5, wherein, by selectively engaging the first, second, third, fourth, and fifth elements (A, B, C, D, E):
  a first gear (1) results between the input shaft (GW1) and the output shaft (GWA) by actuating the second shift element (B) and the third shift element (C);
  a second gear results between the input shaft (GW1) and the output shaft (GWA) in a first variant (2.1) by engaging the second shift element (B) and the fifth shift element (E), in a second variant (2.2) by actuating the first shift element (A) and the fifth shift element (E), in a third variant (2.3) by engaging the third shift element (C) and the fifth shift element (E), in a fourth variant (2.4) by actuating the first shift element (A) and the third shift element (C), and in a fifth variant (2.5) by engaging the fifth shift element (E); and
  a third gear results between the input shaft (GW1) and the output shaft (GWA) in a first variant (3.1) by engaging the second shift element (B) and the fourth shift element (D), in a second variant (3.2) by engaging the first shift element (A) and the fourth shift element (D), in a third variant (3.3) by actuating the third shift element (C) and the fourth shift element (D), and in a fourth variant (3.4) by engaging the fourth shift element (D).

9. The transmission (G) of claim 7, further comprising a sixth shift element (F), wherein:
  the sixth shift element (F), upon actuation, connects two of the three elements (E11, E21, E31) of the first planetary gear set (P1) to each other in a rotationally fixed manner, the second gear also results between the input shaft (GW1) and the output shaft (GWA) in a sixth variant (2.6) by engaging the fifth shift element (E) and the sixth shift element (F), in a seventh variant (2.7) by actuating the first shift element (A) and the sixth shift element (F), and in an eighth variant (2.8) by engaging the third shift element (C) and the sixth shift element (F), and the third gear results between the input shaft (GW1) and the output shaft (GWA) in a fifth variant (3.5) by actuating the fourth shift element (D) and the sixth shift element (F).

10. The transmission (G) of claim 9, wherein the second shift element (D) and the sixth shift element (F) are combined to form a shift element pair (SP2) with an associated actuating element, and wherein the actuating element is configured to actuate either the second shift element (B) or the sixth shift element (F) from a neutral position.

11. The transmission (G) of claim 7, wherein the fourth shift element (D) and the fifth shift element (E) are combined to form a shift element pair (SP1) with an associated actuating element, and wherein the actuating element is configured for actuating either the fourth shift element (D) or the fifth shift element (E) from a neutral position.

12. The transmission (G) of claim 1, wherein a rotor (R) of the electric machine (EM) is rotationally fixed to the third element (E31) of the first planetary gear set (P1) or is coupled via at least one transmission ratio step to the third element (E31) of the first planetary gear set (P1).

13. The transmission (G) of claim 12, wherein a first gear (E1) results between the rotor (R) of the electric machine (EM) and the output shaft (GWA) by engaging the second shift element (B).

14. The transmission (G) of claim 13, further comprising a sixth shift element (F), wherein the sixth shift element (F), upon actuation, connects two of the three elements (E11, E21, E31) of the first planetary gear set (P1) to each other in a rotationally fixed manner, and a second gear (E2) results between the rotor (R) of the electric machine (EM) and the output shaft (GWA) by actuating the sixth shift element (F).

15. The transmission (G) a of claim 1, further comprising a sixth shift element (F), wherein the sixth shift element (F), upon actuation, connects two of the three elements (E11, E21, E31) of the first planetary gear set (P1) to each other in a rotationally fixed manner.

16. The transmission (G) of claim 1, wherein one or more of the first, second, third, fourth, and fifth shift elements (A, B, C, D, E; A, B, C, D, E, F) is a form-locking shift element.

17. The transmission (G) claim 1, wherein the first shift element (A) and the third shift element (C) are combined to form a shift element pair with an associated actuating element, and wherein the actuating element is configured for actuating either the first shift element (A) or the third shift element (C) from a neutral position.

18. A motor vehicle drive train for a hybrid or electric vehicle, comprising the transmission (G) of claim 1.

19. A method for operating the transmission (G) of claim 2, wherein only the third shift element (C) is engaged in order to implement a charging operation or a starting operation.

20. A method for operating the transmission (G) of claim 2, wherein the first shift element (A) is engaged in order to implement a starting mode for forward travel during driving with the input shaft (GW1).

* * * * *